United States Patent
Nomura

(10) Patent No.: US 9,925,660 B2
(45) Date of Patent: Mar. 27, 2018

(54) METHOD FOR POSITIONING MICRO-TOOL AND MICRO-MANIPULATOR DEVICE

(71) Applicant: Narishige Lifemed Co., Ltd., Tokyo (JP)

(72) Inventor: Toru Nomura, Tokyo (JP)

(73) Assignee: Narishige Lifemed Co., Ltd., Tokyo (JP)

( * ) Notice: Subject to any disclaimer, the term of this patent is extended or adjusted under 35 U.S.C. 154(b) by 117 days.

(21) Appl. No.: 15/115,304

(22) PCT Filed: Oct. 1, 2014

(86) PCT No.: PCT/JP2014/076331
§ 371 (c)(1),
(2) Date: Jul. 29, 2016

(87) PCT Pub. No.: WO2016/051563
PCT Pub. Date: Apr. 7, 2016

(65) Prior Publication Data
US 2017/0001302 A1    Jan. 5, 2017

(51) Int. Cl.
*G01C 9/34* (2006.01)
*B25J 7/00* (2006.01)
*G02B 21/32* (2006.01)

(52) U.S. Cl.
CPC .............. *B25J 7/00* (2013.01); *G02B 21/32* (2013.01)

(58) Field of Classification Search
CPC ........................................................ G01C 9/34
USPC ................................................... 33/613, 645
See application file for complete search history.

(56) References Cited

U.S. PATENT DOCUMENTS

| 3,557,379 | A | * | 1/1971 | Kelsey | B23Q 35/30 250/206.1 |
| 5,810,841 | A | * | 9/1998 | McNeirney | A61B 17/3403 33/286 |
| 5,845,541 | A | * | 12/1998 | Yoneyama | B25J 7/00 414/2 |

(Continued)

FOREIGN PATENT DOCUMENTS

JP    3295836 B2    6/2002
JP    2002-333387 A    11/2002

(Continued)

OTHER PUBLICATIONS

International Search Report by Japanese Patent Office for corresponding PCT/JP2014/076331 application dated Jan. 13, 2015 (4 pages).

*Primary Examiner* — G. Bradley Bennett
(74) *Attorney, Agent, or Firm* — Capitol City TechLaw, PLLC; Samuel P. Burkholder

(57) ABSTRACT

A method for positioning a micro-tool (4) comprises: a positioning gauge positioning process (S1) including placing a gauge surface (5d) of a positioning gauge (5) at a needle tip position while the positioning gauge (5) is fixed to a holding part (30), and aligning a mark (5b) provided in the positioning gauge (5) with the optical axis (62a) of an objective lens (62); a positioning gauge focus adjustment process (S2) to focus on the mark (5b) in a state where the positioning gauge (5) has been positioned; and a micro-tool attachment process (S3) including fixing the micro-tool (4) to the holding part (30) after removing the positioning-gauge (5) from the holding part (30).

8 Claims, 14 Drawing Sheets

(56) References Cited

U.S. PATENT DOCUMENTS

| | | | | |
|---|---|---|---|---|
| 5,890,863 | A | * | 4/1999 | Yoneyama ................. B25J 7/00 414/4 |
| 5,918,507 | A | * | 7/1999 | Yoneyama ................. B25J 7/00 414/2 |
| 6,047,479 | A | * | 4/2000 | Galestien ............... G01B 5/204 33/546 |
| 2002/0166976 | A1 | | 11/2002 | Sugaya et al. |
| 2009/0007449 | A1 | * | 1/2009 | Liu ........................ G01B 3/008 33/556 |
| 2010/0031519 | A1 | * | 2/2010 | Guiney ................ B43K 23/001 33/27.01 |
| 2016/0033267 | A1 | * | 2/2016 | Killingbeck ............. G01B 5/25 33/645 |

FOREIGN PATENT DOCUMENTS

| | | |
|---|---|---|
| JP | 2008-46324 A | 2/2008 |
| JP | 2009-58931 A | 3/2009 |
| JP | 2009-229448 A | 10/2009 |
| JP | 2011-13223 A | 1/2011 |

* cited by examiner

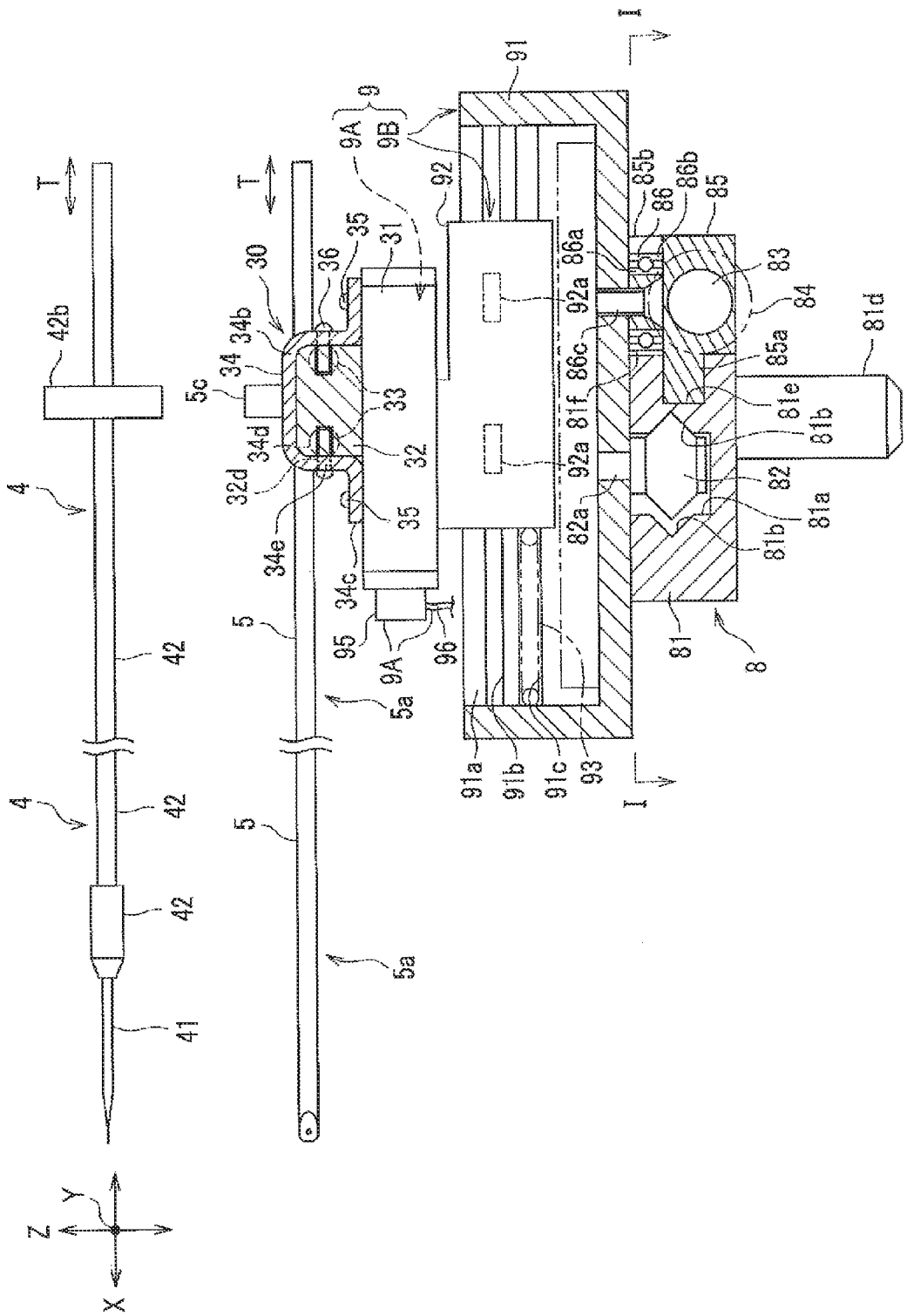

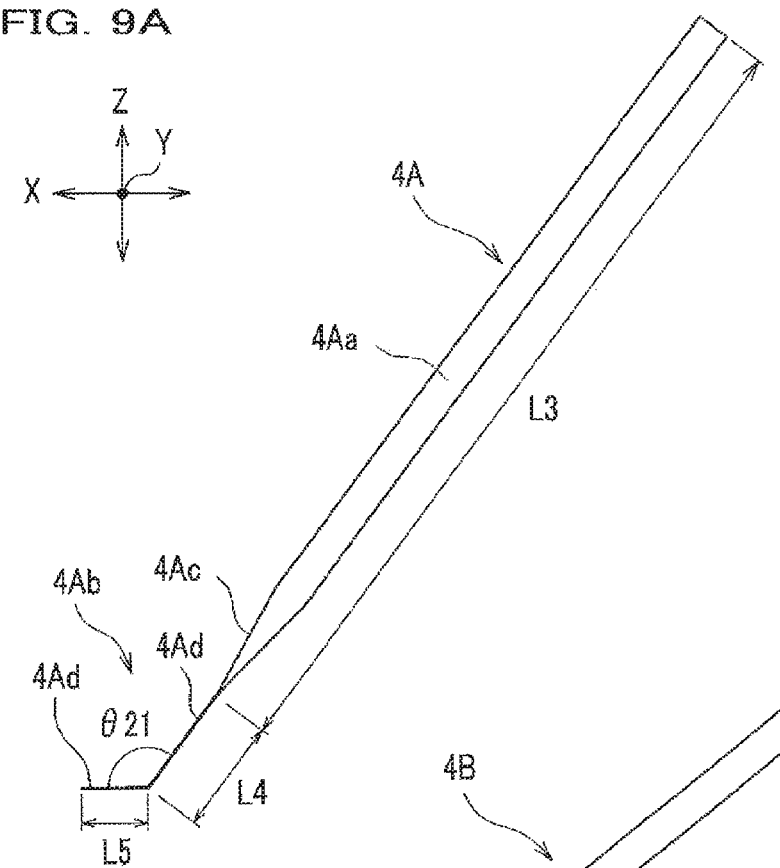
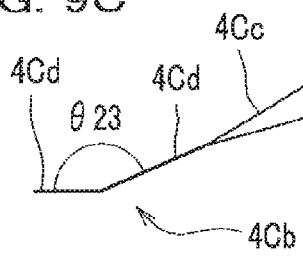
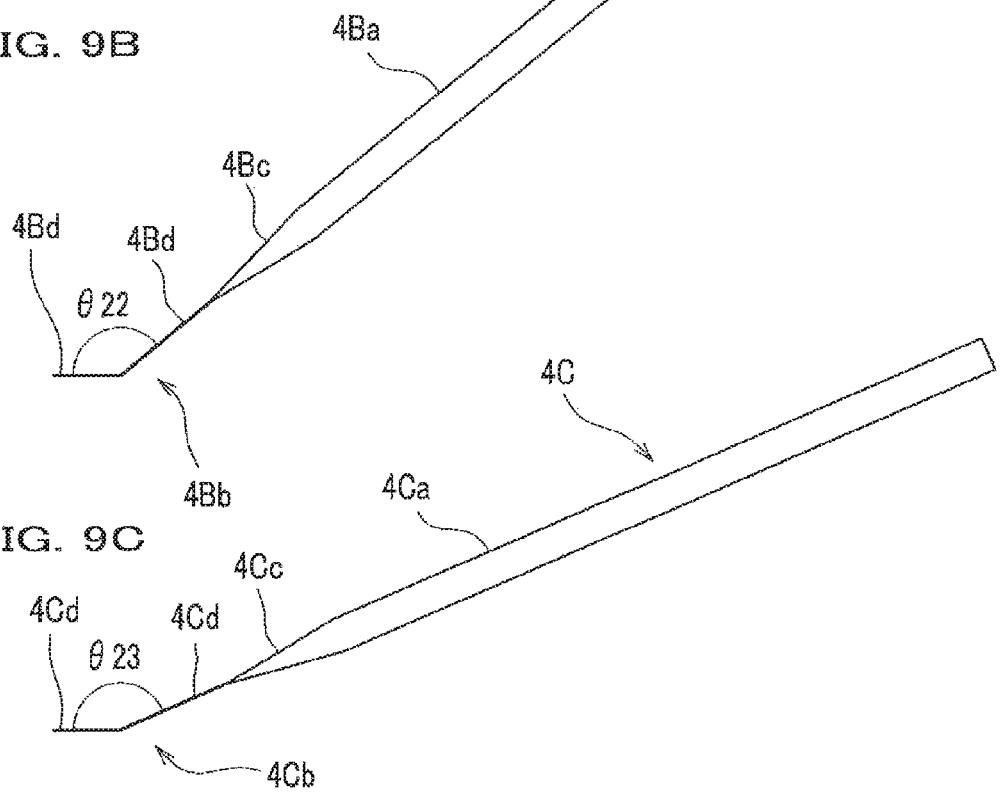

METHOD FOR POSITIONING MICRO-TOOL AND MICRO-MANIPULATOR DEVICE

TECHNICAL FIELD

The present invention relates to a method for positioning a micro-tool and a micro-manipulator device which are used for positioning a front end portion of a capillary, a pipette, a micro-sampling tool, a micro needle, an electrode, tweezers, a knife, a forceps, or the like (hereinafter, called a "micro-tool"), which are used when, for example, microinsemination (icsi) where a sperm is directly injected into an ovum, in vitro fertilization (ivf), or an actual operation on various micro objects such as a cell, a fungus, a micro animal, dust, and powder, is carried out, for focusing of a microscope, or for the like.

BACKGROUND ART

Conventionally, when microinsemination or in vitro fertilization is carried out, a micro-manipulator device, which has a microscope and a micro-manipulator that moves a micro-tool in three-dimensional directions in a visual field of the microscope, and carries out a fine operation such as an injection or suction, has been used (for example, refer to a patent document 1).

A micro-manipulator device described in the patent document 1 is a device which can operate a micro-tool such as a micro-pipette in fine movements under a microscope by remote control under the hydraulic pressure such as oil pressure when an inspection object (sample) such as an organ of an animal, biotissue, or a cell is held or moved, and a fine movement operation such as suction, injection of a liquid, or cutting is carried out on the inspection object.

In particular, when a fine operation is carried out on an inspection object with use of the micro-tool in an actual operation such as microinsemination or in vitro fertilization, a rapid and precise operation is required.

PRIOR ART DOCUMENT

Patent Document

Patent document 1: JP3295836, B

SUMMARY OF THE INVENTION

Problems to Be Solved By the Invention

However, in the actual operation, a size of the inspection object and a diameter of the needle tip of the micro-tool are about a few microns, that is, minimal, and distances (operation ranges in X, Y, Z-directions) from an inner bottom surface of a dish for putting the inspection object therein to the inspection object at the time of operation-working are extremely short. Therefore, there has been a problem that an adjustment operation for adjusting a position in a height direction is hard.

In particular, when an angle and/or positions in the X, Y, Z-directions of the micro-tool are initially set (needle-position adjustment), or when the microscope is focused, since distances from the inner bottom surface of the dish to the positions to be set are a few microns, that is, short, the needle tip sometimes comes into contact with the surface of the dish, so that the needle tip is sometimes bent or damaged. Accordingly, the micro-tool often needs to be changed, so that there has been a problem that it takes a time to change it.

And furthermore, the needle tip of the micro-tool is extremely delicate, so that it is necessary for the needle tip not to be come into contact with the inner bottom surface of the dish and to be set carefully. Therefore, operation-working for the initial setting (positioning) of the micro-tool has been an operation requiring a skill and a time.

Furthermore, conventionally, when a plurality of kinds of micro-tool are used, a shape, a length, a position of the needle tip, and an angle of the needle vary for each micro-tool, so that there has been a problem that positioning operation is hard and a time is required when a microscope is focused.

Such operation is desired to be carried out with use of a high-powered microscope, but a visual field of the high-powered microscope is narrow, so that positioning of the needle tip becomes harder. That is, there is a problem that work efficiency and workability are low.

The present invention is created in view of such problems. It is an object of the present invention to provide a method for positioning a micro-tool and a micro-manipulator device by which the micro-tool can be rapidly, precisely and easily positioned to be attached.

Means for Solving the Problems

In order to solve the problems, a method for positioning a micro-tool according to the present invention includes:

a positioning gauge positioning process including placing a gauge surface of a positioning gauge at a needle tip position while the positioning gauge is fixed to a holding part, and aligning a mark provided in the positioning gauge with an optical axis of an object lens; and a micro-tool attachment process including fixing the micro-tool to the holding part after removing the positioning gauge from the holding part.

The "micro-tool" is a member for carrying out a series of operations such as separating, classifying, processing, selecting, treating on a fine particle such as an ovum, a cell, a fungus in a field such as a medical field, a pharmaceutical field, an outbreak engineering field, a livestock industry or a biotechnology industry like breeding, or a chemical industry field. For example, the micro-tool is a capillary, a pipette, a micro-pipette, a micro-sampling tool, an electrode made of glass or the like, a micro needle, a fine tubule, or the like.

According to this constitution, in the method for positioning a micro-tool, after the positioning process, in which the gauge surface is placed at the needle tip position while the positioning gauge is fixed to the holding part and the mark is aligned with the optical axis, is carried out, the micro-tool attachment process, in which the micro-tool is fixed to the holding part after removing the positioning gauge from the holding part, is carried out. Thus the positioning operation is carried out. Therefore, after the positioning gauge is positioned at a position near a front end portion of the micro-tool, only by attaching the micro-tool in place of the positioning gauge, the positioning operation is finished. Therefore, the micro-tool can be attached in a short time and at a correct position and angle by a simple operation. Furthermore, a complex positioning operation becomes easy, so that work efficiency and workability of the positioning operation can be improved. Therefore, even a person without skill can carry out an accurate positioning rapidly and repeatedly. In addition, since the positioning operation does not need to be carried out directly with use of a micro-tool, the micro-tool can be prevented from being damaged. Furthermore, a micro-tool of the present invention does not need to be moved to a position extremely near a position where the micro-tool is actually used after the micro-tool is positioned at a virtual position as conventionally having carried out. Therefore, the positioning operation for a micro-tool according to the present invention can be rapidly carried out.

Furthermore, it is preferred that a positioning gauge focus adjustment process to focus on the mark in a state where the positioning gauge has been positioned in the positioning gauge positioning process is included.

According to this constitution, since the method for positioning a micro-tool is carried out in the state where the positioning gauge has been positioned in the positioning gauge focus adjustment process to focus on the mark, a focus position can be easily positioned.

Furthermore, it is preferred that the positioning gauge has a gauge attachment part provided at a position away from the mark formed at a front end portion toward a base end side of the positioning gauge by a prescribed distance set beforehand, and that the micro-tool has a tool attachment part provided at a position away from a front end toward a base end side of the micro-tool by the same distance as the prescribed distance.

According to this constitution, since the distance from the front end portion to the gauge attachment part of the positioning gauge is the same as the distance from the front end to the tool attachment part of the micro-tool, by positioning the positioning gauge and replacing it with the micro-tool, the micro-tool can be attached by a single operation. Therefore, the positioning operation to position the micro-tool becomes simple and easy, so that it can be carried out correctly and rapidly.

Furthermore, it is preferred that the positioning gauge is held by the holding part in an upward oblique posture positioned on and above an inner bottom surface of a dish placed at a prescribed position on a table of a microscope, that the gauge surface is formed to be flat at a front end portion of the positioning gauge and is placed on the inner bottom surface of the dish at a time of positioning, and that the mark is formed to be orthogonal to the gauge surface, and is positioned on the optical axis at the time of positioning.

According to this constitution, the positioning gauge is positioned by placing the gauge surface on the inner bottom surface of the dish and positioning the mark on the optical axis at a time of positioning. As the gauge surface is formed to be orthogonal to the mark, even when the positioning gauge is disposed obliquely, the mark can be set to be parallel to the inner bottom surface of the dish at a prescribed position of the inner bottom surface. Therefore, the positioning of the positioning gauge can be correctly carried out.

Furthermore, it is preferred that the holding part is provided in a movement mechanism for moving the positioning gauge detachably attached to the holding part, that the movement mechanism includes a rotation mechanism for pivoting the holding part holding the positioning gauge around the mark formed at the front end portion of the positioning gauge, and a linear movement mechanism for linearly moving the holding part in T-directions along the positioning gauge, to position the positioning gauge, and that the micro-tool is attached after the holding part holding the positioning gauge, positioning of which has been finished, releases the positioning gauge in a state of fixing a position on a Y-axis.

According to this constitution, since the movement mechanism provided with the holding part has the rotation mechanism configured to be capable of pivoting around the mark, even in the case where the positioning gauge or the micro-tool is pivoted to be inclined by the movement mechanism, the position of the front end of the positioning gauge or the micro-tool never deviates from the center position of the mark. Furthermore, by the movement mechanism including the linear movement mechanism for linearly moving the holding part in the T-directions of the positioning gauge, after the holding part is moved backward in the state where positioning has been finished, the movement mechanism can move the holding part forward to return to the original position which has been determined by the positioning. Therefore, the positioning operation for a micro-tool can be simplified, so that work efficiency and workability can be improved. Even in the case where the positioning gauge or the micro-tool is pivoted by the movement mechanism, the position of the front end of the positioning gauge or the micro-tool never shifts. Furthermore, since the holding part holding the positioning gauge which has been positioned is fixed on the Y-axis, the holding part never shifts in the Y-axis direction. Therefore, positioning can be easily carried out. By the movement mechanism including the linear movement mechanism for linearly moving the holding part in the T-directions of the positioning gauge, after the holding part is moved backward in the state where positioning has been finished, the movement mechanism can move the holding part forward to return to the original position which has been determined by the positioning. Therefore, the positioning operation for a micro-tool can be simplified, so that work efficiency and workability can be improved.

It is preferred that the linear movement mechanism advances the holding part to return to a position where the positioning gauge has been positioned after the holding part holding the positioning gauge, positioning of which has been finished in the positioning gauge positioning process, is retreated.

According to this constitution, by the linear movement mechanism, the holding part can be moved forward to return to the original position which has been determined by the positioning after the holding part holding the positioning gauge, positioning of which has been finished, is retreated. For this reason, by replacing the positioning gauge with the micro-tool to be attached after the positioning gauge is retreated while the holding part holds the positioning gauge having been positioned, the holding part never shifts in the X, Y, Z-axis directions. Thus, without directly positioning the micro-tool itself, the micro-tool can be set at the position which has been determined. That is, the positioning of the micro-tool can be carried out simply and easily.

A micro-manipulator device according to the present invention includes:

a micro-tool having a tool attachment part provided at a position away from a front end toward a base end side of the micro-tool by a prescribed distance set beforehand, and a micro-manipulator for carrying out micro operation for an inspection object in a visual field of a microscope with use of the micro-tool, and is characterized in that the micro-manipulator device further includes:

a holding part to detachably hold the micro-tool or a positioning gauge having a gauge attachment part provided at a position away from a mark provided at a front end portion toward a base end side of the positioning gauge by the prescribed distance; and a movement mechanism for positioning the positioning gauge in T-axis directions.

According to this constitution, the micro-manipulator device according to the present invention includes the movement mechanism which positions the holding part to detachably hold the micro-tool or the positioning gauge in the T-axis directions. Therefore, by exchanging the positioning gauge having been positioned for the micro-tool and attaching the micro-tool, the positioning can be carried out. Therefore, it is not necessary to adjust a position of the micro-tool each time when the micro-tool is attached to the micro-manipulator device. For this reason, the micro-tool can be correctly attached in a short time and the positioning operation can be rapidly carried out.

And furthermore, it is preferred that the movement mechanism includes:

a rotation mechanism for pivoting the holding part holding the positioning gauge around the mark provided at the front end portion of the positioning gauge; and a linear movement mechanism for linearly moving the holding part in the T-axis directions along the positioning gauge.

According to this constitution, the movement mechanism includes the rotation mechanism configured to be capable of pivoting the holding part around the mark, so that the position of the front end of the positioning gauge or the micro-tool does not shift when the positioning gauge or the micro-tool is pivoted by the rotation mechanism. Furthermore, the movement mechanism includes the linear movement mechanism for linearly moving the holding part in the T-axis directions along the positioning gauge, so that after the holding part is moved backward in the state where positioning has been finished, the holding part can be moved forward to return to the original position which has been determined by the positioning. Therefore, the positioning operation for a micro-tool can be simplified, so that work efficiency and workability can be improved.

Effect of the Invention

By the method for positioning a micro-tool or the micro-manipulator device according to the present invention, the micro-tool can be correctly attached in a short time.

BRIEF DESCRIPTION OF THE DRAWINGS

FIG. 5 is a schematic enlarged partial broken side view showing a movement mechanism;

FIG. 9A is a schematic side view of a modified example of the micro-tool of the micro-manipulator device according to the embodiment of the present invention;

FIG. 9B is a schematic side view of another modified example of the micro-tool of the micro-manipulator device according to the embodiment of the present invention;

FIG. 9C is a schematic side view of still another modified example of the micro-tool of the micro-manipulator device according to the embodiment of the present invention;

MODE FOR CARRYING OUT THE INVENTION

Next, a micro-manipulator device according to an embodiment of the present invention will be explained with reference to FIG. 1 to FIG. 8.

Note that, the micro-manipulator device 1 can be used for positioning the above-said various micro-tools 4. Hereinafter, an example, in which a capillary (or a pipette) is considered to be the micro-tool 4, will be explained, which capillary is used when an actual operation such as microinsemination or in vitro fertilization is carried out.

In advance of an explanation of the micro-manipulator device 1 according to the embodiment of the present invention, an inspection object S to be operated by using the micro-manipulator device 1 will be explained.

<<Inspection Object>>

Figure 2A:
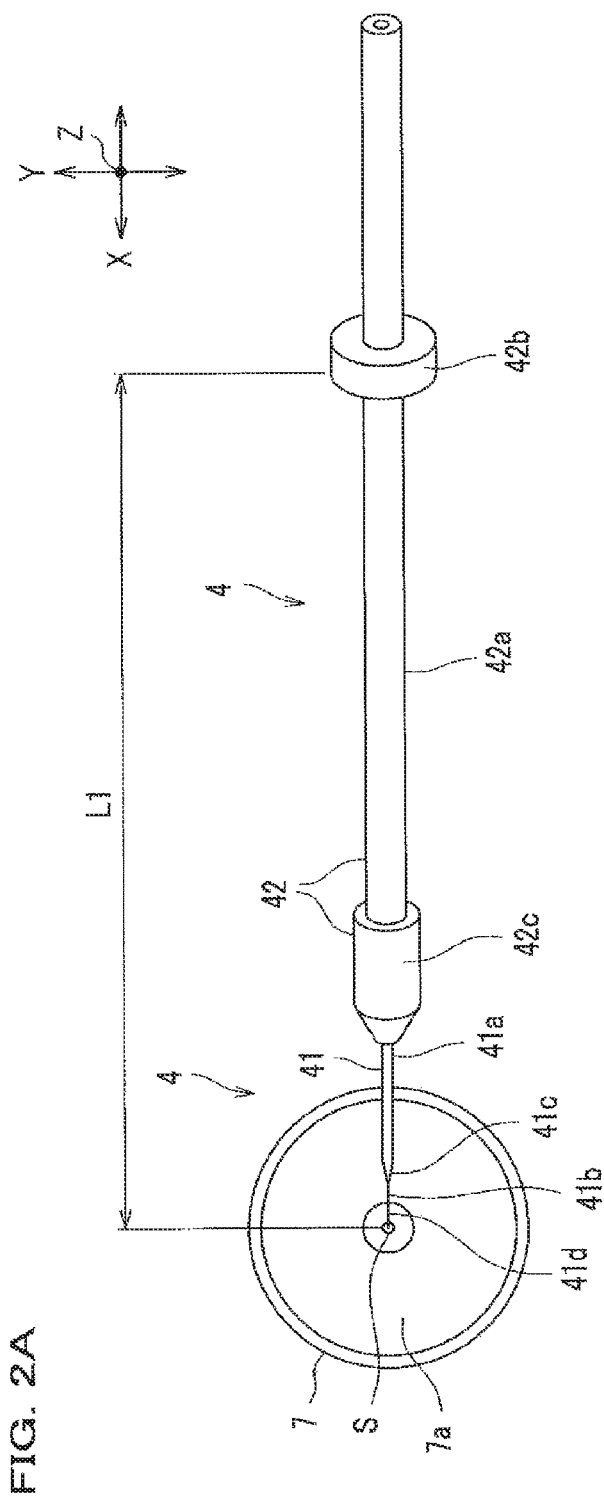
FIG. 2A is a schematic plan view showing the micro-tool.

The inspection object S shown in FIG. 2A is, for example, an ovum to be used in an actual operation such as microinsemination or in vitro fertilization, is placed on an inner bottom surface 7a of a dish 7, and is covered with oil or a solution (liquid medicine), and a sperm is injected into the inspection object S (ovum) through the micro-tool 4. The inspection object S is placed on an optical axis 62a on the inner bottom surface 7a of the dish 7.

<<Micro-manipulator Device>>

Figure 1:
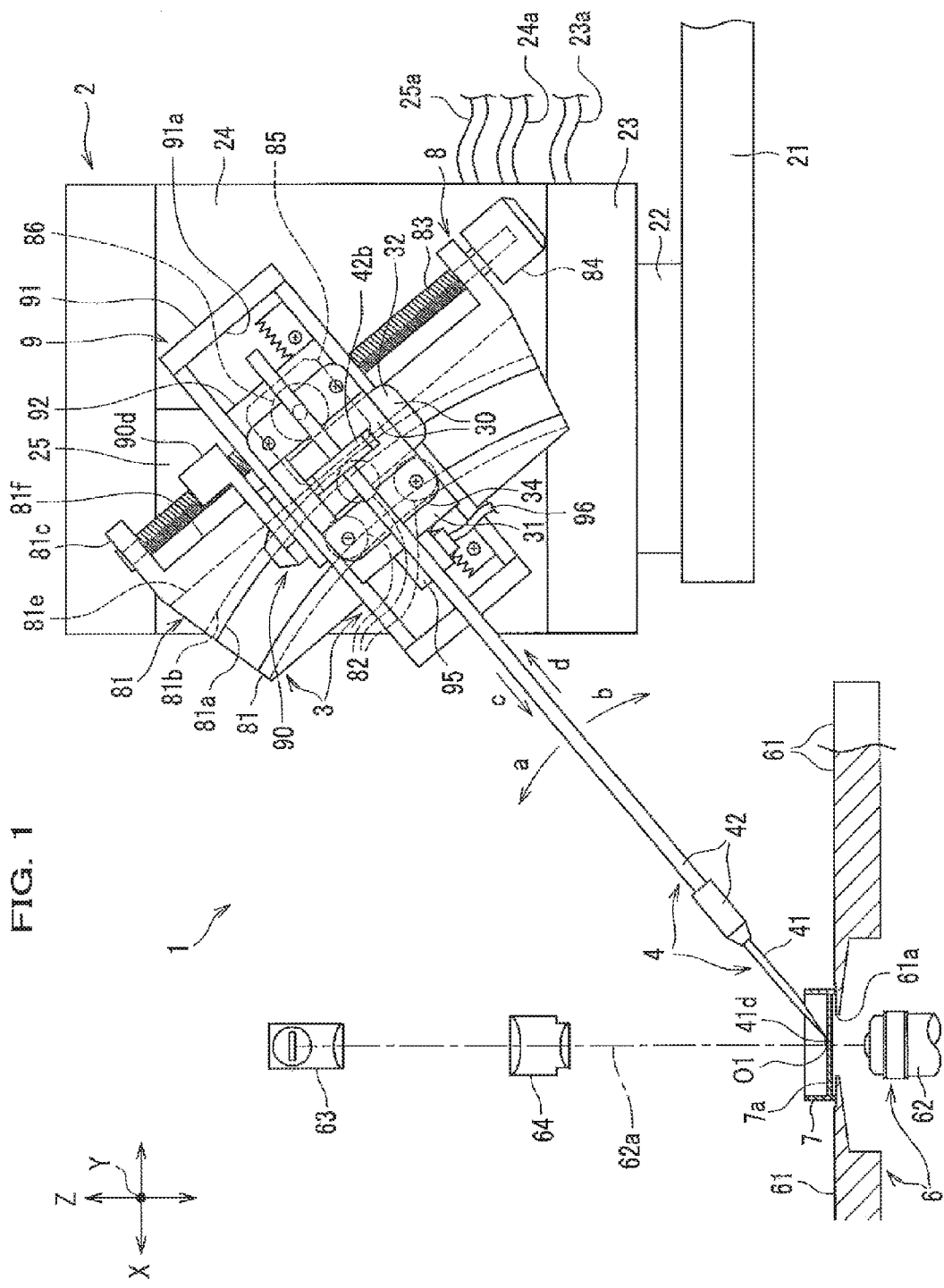
FIG. 1 is a schematic side view showing a micro-manipulator device, to which a micro-tool is attached, according to an embodiment of the present invention.

As shown in FIG. 1, the micro-manipulator device 1 is a device which is used for injecting a sperm into the inspection object S (ovum) when microinsemination or in vitro fertilization is carried out. The micro-manipulator device 1 is provided with a microscope 6, a micro-manipulator 2, a positioning gauge 5, a holding part 30, and a movement mechanism 3. The micro-manipulator 2 carries out, in a visual field of the microscope 6, micro operations such as three-dimensional movements of the micro-tool 4, and injecting a sperm into or suctioning the sperm out of the ovum. The positioning gauge 5 has a gauge attachment part 5c. The holding part 30 holds the micro-tool 4 detachably. The movement mechanism 3 adjusts a position of the positioning gauge 5 in a Y (Y-axis) direction.

<Microscope>

The microscope 6 is an inverted microscope unit to be used at the time of positioning a needle tip of the micro-tool 4 and setting an angle of the micro-tool 4 to be in a predetermined-angle state, or at the time of carrying out a delicate operation such that a sperm is injected into the small inspection object S by using the micro-manipulator device 1. The microscope 6 is provided with a base not shown, a column (not shown) installed on the base, a table 61 attached to the column, an objective lens 62 disposed below the table 61, a light source 63 disposed above the table 61, a light collector 64 disposed between the light source 63 and the table 61, and a diaphragm disposed between the light collector 64 and the light source 63. The size of the visual field of the microscope 6 is around several millimeters in a front-rear and a left-right directions as shown in the front-rear direction in FIG. 4D, for example, in the case of low magnification of 40 times. Note that, the microscope 6 may be an upright type one. Furthermore, the microscope 6 can be adopted even if it is a microscope of high magnification, however, an example of the case of 40 times will be explained.

The table 61 is a plate-like member horizontally attached to the column of the base not shown, and has an opening 61a.

The objective lens 62 is upwardly disposed under the table 61, and roughly on a center line passing the center of the opening 61a (note that, it may be located not on the center line of the opening 61a). On the optical axis 62a of the objective lens 62, the dish 7, the light collector 64, and the light source 63 are disposed so that respective centers of them are located on the optical axis. At the time of initial gauge-fitting, a lens of magnification of, for example, 4 times (the range of the visual field is about φ 5) is used as the objective lens 62, The light source 63 is a lamp to illuminate the objective lens 62 through the light collector 64 and the dish 7.

The light collector 64 is a unit to concentrate the light emitted from the light source 63 to send it to the objective lens 62 through the dish 7.

<Dish>

As shown in FIG. 2A, the dish 7 is a dish on which the inspection object S is placed, and has a shape of, for example, a Petri dish (Schale) having a circular edge. The dish 7 is a dish-shaped member made of a transparent material such as glass, and has a horizontal inner bottom surface 7a. As shown in FIG. 1, the dish 7 is placed on the table 61 of the microscope 6 so that the dish closes the opening 61a formed approximately at the central position of the table 61.

<Micro-Manipulator>

The micro-manipulator 2 is a unit to carry out a micro operation using the micro-tool 4 on the inspection object S in the visual field of the microscope 6, and is mounted on the microscope 6. The micro-manipulator 2 is provided with a base (not shown) of the micro-manipulator 2, a column (not shown) standing on the base not shown, an arm 21, an attachment part 22, the micro-tool 4 (positioning gauge 5), the movement mechanism 3, an X-axis micro-motion mechanism 23, a Y-axis micro-motion mechanism 24, and a Z-axis micro-motion mechanism 25. The base end of the arm 21 is rotatably attached to the column. The attachment part 22 is a part to attach the front end part of the arm 21 to the X-axis micro-motion mechanism 23. The movement mechanism 3 makes the positioning gauge 5 incline and linearly move (forward and backward). The X-axis micro-motion mechanism 23 moves the movement mechanism 3 in X-directions. The Y-axis micro-motion mechanism 24 moves the movement mechanism 3 in Y-directions. The Z-axis micro-motion mechanism 25 moves the movement mechanism 3 in Z-directions.

The arm 21 is a member to support the micro-manipulator 2, and is attached to the column vertically provided to the base (not shown) or to a frame provided to the column.

The attachment part 22 is a part to mount the micro-manipulator 2 on the arm 21.

<Micro-Tool>

The micro-tool 4 is a member to carry out a series of operations of separating, classifying, processing, selecting, treating, and the like on a minute particle such as an ovum, a cell, or a fungus in fields such as the medical field, the pharmaceutical field, the biotechnology industry field like selective breeding, the livestock industry field, the developmental engineering field, and the chemical industry field. The micro-tool 4 is, for example, a capillary, a pipette, a micro-pipette, a micro sampling tool, an electrode made of glass or the like, a micro needle, a fine tube, or the like. Hereinafter, the case of a capillary pipette (also called "micro-pipette") will be explained as an example of the micro-tool 4.

As shown in FIG. 2A, the micro-tool 4 is mainly composed of a tool body 41 forming the capillary pipette, and a tool holder body 42 connected to a base side of the tool body 41. Hereinafter, the case where the tool body 41 and the tool holder body 42 are separated from each other will be explained as an example of the micro-tool 4. However, the micro-tool 4 may be one where the tool body 41 and the tool holder body 42 are integrated with each other.

The micro-tool 4 has a tool attachment part 42b at the position away from the front end of the micro-tool 4 toward a base side of the micro-tool by a prescribed distance L1. The prescribed distance L1, which is a distance away from the front end of the tool body 41 to the tool attachment part 42b of the tool holder body 42, is set to have the same length as a prescribed distance L2 previously set, which distance L2 is a distance from a gauge hole (mark) 5b to the gauge attachment part 5c of the positioning gauge 5 shown in FIGS. 4A to 4D.

Figure 2B:
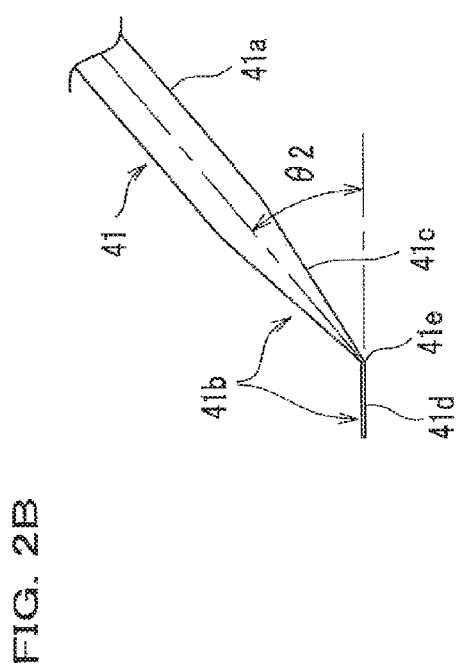
FIG. 2B is a side view of a front end portion of the micro-tool.

As shown in FIGS. 2A, 2B, the tool body 41 is made of, for example, a glass tube which has a base part 41a of a fine cylindrical tube having a diameter of about 1 mm and a front end part 41b having a tapered shape getting narrower toward a front end side thereof from a base end of the base part 41a.

A shape adapted for the inspection object S is used as the shape of the front end part 41b. So there are various shapes according to the inspection object S. One to be used when microinsemination, in vitro fertilization, or the like is carried out will be explained as an example. The front end part 41b is formed of a tapered portion 41c formed on a base end side thereof, a fine portion 41d formed from a front end side of the tapered portion 41c to a tip end of the tool body 41, and a bent portion 41e formed between the tapered portion 41c and the fine portion 41d.

The fine portion 41d is formed of an extremely fine tubular member which has, for example, a length of about 0.5 to about 2 mm (sometimes, about 6 mm) from the base end to the tip end thereof and an outer diameter of about 10 μm. As the bent portion 41e is bent at an angle of 30 degrees, the fine portion 41d is disposed in a horizontal state along the inner bottom surface 7a of the dish 7.

The bent portion 41e is a bent site formed in order to make the fine portion 41d horizontal along the inner bottom surface 7a of the dish 7 relative to the base part 41a and the tapered portion 41c disposed in an inclined state of, for example, the angle of 30 degrees.

The front end of the tool body 41 of the micro-tool 4 formed in this way is disposed to be positioned at a predetermined reference position O1 which is on the optical axis 62a of the objective lens 62, as shown in FIG. 1. The reference position O1, later described in detail, is set to a position having a height H (refer to FIG. 4C), by which height H the reference position is slightly away from the inner bottom surface 7a of the dish 7 and is on the optical axis 62a, and the front end of the tool body 41 is at a position not in contact with the inner bottom surface 7a of the dish 7.

The tool holder body 42 is a fixing tool to hold the base end side of the base part 41a of the tool body 41, and is also called as an injection holder. The tool holder body 42 has a cylindrical tube 42a, a clamp screw 42c disposed on the front end portion of the cylindrical tube 42a, and the tool attachment part 42b fixed at a position on the base end portion side of the cylindrical tube 42a. The whole of the tool holder body 42 is made of stainless steel.

The cylindrical tube 42a is made of a stainless steel tube having a straight shape. An end portion of a tube not shown is attached to the base end side of the cylindrical tube 42a. A pressuring device and the like are attached to the other end side of the tube.

The tool attachment part 42b is formed of a circular plate member of a thick plate which is fitted onto the outside surface of the cylindrical tube 42a, and is a part which is detachably held by the holding part 30 of the movement mechanism 3, and is capable of rotating in an angle of 360 degrees in a circular direction of an axis-rotational direction. When the tool attachment part 42b is attached to the holding part 30 of the movement mechanism 3 in a state where the positioning to a prescribed position has been finished by using the positioning gauge 5 attached to the movement mechanism 3 to be described later, the tool attachment part 42b is held in such a state that the micro-tool 4 is positioned in a prescribed state in a single operation.

As shown in FIG. 2A, the clamp screw 42c is a part to detachably hold the micro-tool 4 inserted in the clamp screw 42c, and is constituted, for example, by a watertight collet chuck. For example, the watertight collet chuck is provided with a clamp screw 42c, a seal member provided inside the front end portion of the cylindrical tube 42a, in which member the tool body 41 is inserted, a tapered male thread part formed on the outer peripheral surface on the front end side of the cylindrical tube 42a, and a nut member to secure and hold the tool body 41 inserted in the cylindrical seal member by making the seal member narrower via the tapered male thread part by engaging the nut member with the tapered male thread part to rotate it. The seal member is made of a flexible rubber packing such as silicone resin, which is provided inside so as to come into contact with the micro-tool 4 and easy to be elastically deformed.

<Positioning Gauge>

Figure 3:
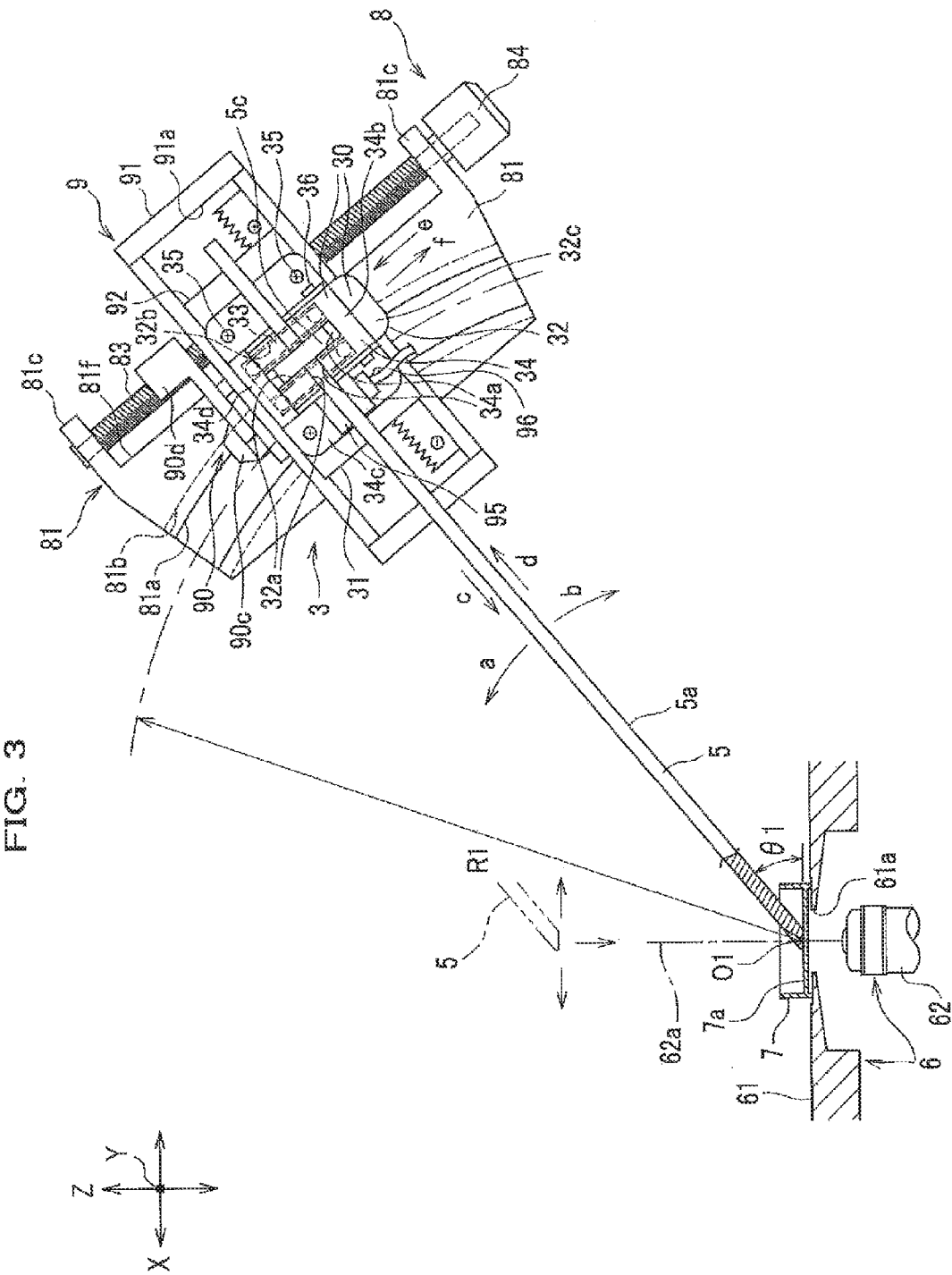
FIG. 3 is a schematic side view showing the device to which a positioning gauge is attached.

As shown in FIG. 3, the positioning gauge 5 is a jig for the initial setting to be used when the micro-tool 4 is attached to the movement mechanism 3 of the micro-manipulator device 1 (refer to FIG. 1) in a state where the micro-tool 4 is properly positioned. When the positioning gauge 5 is used, after the positioning gauge 5 is held to the holding part 30 of the movement mechanism 3 in a state where the positioning gauge 5 is positioned, the positioning gauge 5 is detached, and then the micro-tool 4 is attached to the holding part 30. Thereby, the micro-tool 4 can be positioned indirectly. That is, in the micro-manipulator device 1, when the micro-tool 4 is positioned, the micro-tool 4 is positioned at the prescribed position by using the positioning gauge 5 without directly using the micro-tool 4.

In other words, after the positioning gauge 5 is attached to the holding part 30 of the movement mechanism 3 and positioned at the prescribed position and in the prescribed angle, the positioning gauge 5 is detached and the tool holder body 42 fixed with the micro-tool 4 is attached to the holding part 30 instead. Thereby, the micro-tool 4 can be positioned in a single operation without an operation of directly positioning the micro-tool 4. The positioning gauge 5 is a jig configured to prevent the micro-tool 4 from being damaged because of touching the inner bottom surface 7a of the dish 7 or the like, by indirectly carrying out a positioning operation of positioning the micro-tool 4.

The positioning gauge 5 has a gauge body 5a, the gauge hole 5b, the gauge attachment part 5c, and a gauge surface 5d. The gauge body has a shape of a cylindrical tube. The gauge hole 5b is formed at the front end portion of the positioning gauge 5. The gauge attachment part 5c is provided at a position away from the gauge hole 5b toward a base end side by a distance L2 which is the same distance as the prescribed distance L1 from the front end of the micro-tool 4 to the tool attachment part 42b. The gauge surface 5d is formed at or on a bottom surface of the gauge hole 5b. The positioning gauge 5 is held by the movement mechanism 3 upward in an oblique posture in which the positioning gauge 5 is positioned on and above the inner bottom surface 7a of the dish 7 placed so as to close the opening 61a formed at a prescribed position of the table 61 of the microscope 6.

The gauge body 5a is made of a stainless steel straight bar having a length of 180 mm and an outer diameter of 4 mm. The gauge body 5a is held by the holding part 30 of the movement mechanism 3 in the oblique posture having an angle θ1 (for example, 30 degrees) relative to the inner bottom surface 7a of the dish 7, in which posture the gauge body 5a is inclined upward.

Figure 4A:
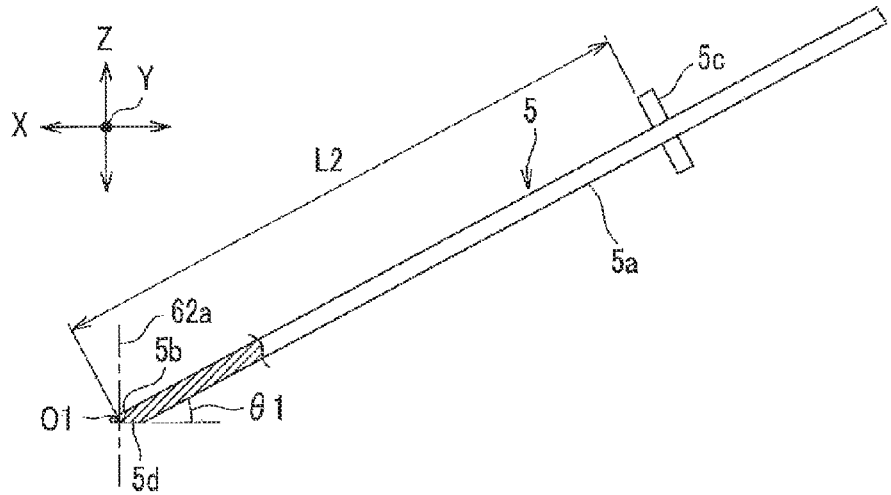
FIG. 4A is a middle-positioned longitudinal sectional view of the positioning gauge.
Figure 4B:
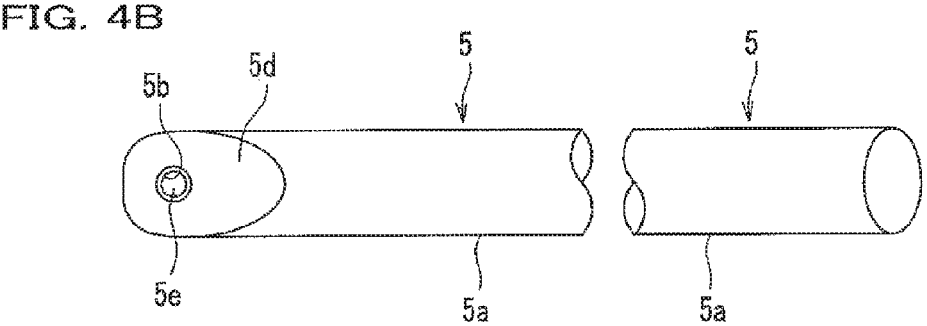
FIG. 4B is an enlarged partial bottom view showing a front end portion and a rear end portion of the positioning gauge.
Figure 4C:
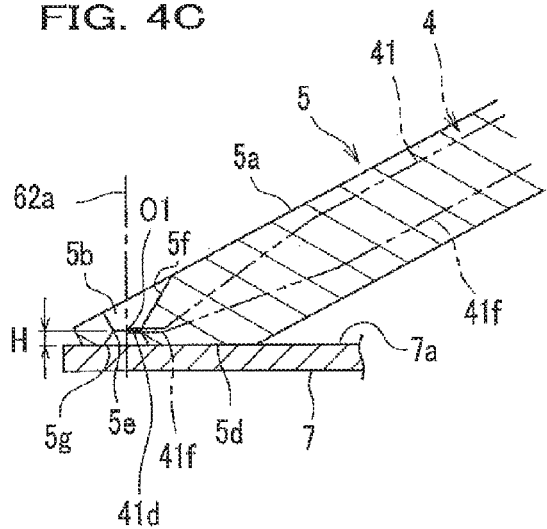
FIG. 4C is an enlarged partial view of a front end portion of FIG. 4A.
Figure 4D:
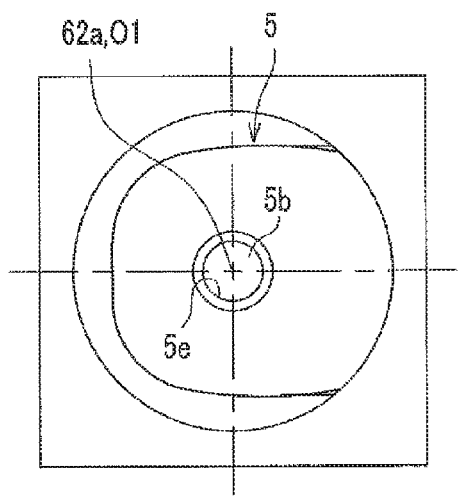
FIG. 4D is an enlarged partial bottom view showing a front end portion of the positioning gauge disposed on the optical axis and on a dish.

As shown in FIG. 4C, the gauge hole 5b (mark) is a hole a center of which is positioned on the optical axis 62a which is to be a positioning point at the time of positioning. The gauge hole 5b is formed at a position 2 mm away from the front end of the gauge body 5a toward the base end side. The gauge hole 5b is positioned on the optical axis 62a which passes through a central portion of the gauge surface 5d. For example, the gauge hole 5b is configured to have a small hole 5e which is formed perpendicularly to the gauge surface 5d at a height H of 0.5 mm (for example, about 0.1 mm to about 0.5 mm) from the gauge surface 5d and which has an inner diameter of 1 mm; a tapered upper side hole 5f which is formed contiguously to and above the small hole 5e and enlarged as it goes up; and a tapered lower side hole 5g which is formed contiguously to and below the small hole 5e and enlarged as it goes down. An inner peripheral edge of the small hole 5e is a portion for positioning a focus and for positioning the front end of the fine portion 41d of the micro-tool 4, and is positioned slightly higher than the gauge surface 5d by the height H. Therefore, the fine portion 41d is prevented from being damaged due to abutting against the gauge surface 5d. Since the inner peripheral edge of the small hole 5e is formed into a wedge shape in a longitudinal sectional view, it is easy to bring into focus at a focal point. That is, the inner peripheral edge of the small hole 5e has a shape by which it is easy to position the focus.

The reference position O1 is a position for focusing the microscope 6 in the state where the positioning gauge 5 has been positioned, and is on the center line inside the inner peripheral edge of the small hole 5e of the gauge hole 5b (inner peripheral edge between the tapered upper side hole 5f and the tapered lower side hole 5g). For this reason, the reference position O1 is set to be a position away from the inner bottom surface 7a of the dish 7 by the height H of the small hole 5e from the gauge surface 5d.

As shown in FIG. 3, the gauge attachment part 5c is a part to be detachably attached to the holding part 30, and is made of an approximately quadrangle thick plate having a thickness capable of inserting in the holding part 30. The gauge attachment part 5c is fixed at the position away from the gauge hole 5b which is positioned at the front end portion of the positioning gauge 5 toward the base end side by the prescribed distance L2 (refer to FIG. 4A).

As shown in FIG. 4C, the gauge surface 5d is formed at the front end portion of the positioning gauge 5 to be a flat surface which has the prescribed angle θ1 set beforehand, and is a placing surface to be placed on the horizontal inner bottom surface 7a of the dish 7 at the time of positioning. At the time of positioning, the gauge surface 5d is positioned so that the gauge hole 5b in the central portion of the gauge surface 5d is positioned on the optical axis 62a of the inner bottom surface 7a of the dish 7 placed to close the opening 61a of the table 61 (refer to FIG. 1). Note that, the prescribed angle θ1 is one of a plurality of angles set beforehand.

When the gauge surface 5d of the positioning gauge 5 formed in this way is placed on the inner bottom surface 7a of the dish 7 without gap and the gauge hole 5b is set onto the optical axis 62a, the position of the needle tip can be positioned in the X, Y, Z, and T-directions, and the angle θ1 is also correctly set automatically.

<Movement Mechanism>

As shown in FIG. 1 or 3, the movement mechanism 3 is a device capable of inclining and/or linearly moving (advancing or retreating) the micro-tool 4 and the positioning gauge 5, and has a function to position the positioning gauge 5 in directions orthogonal to the Y-axis. The movement mechanism 3 has the holding part 30, a rotation mechanism 8, and a linear movement mechanism 9. The holding part 30 detachably holds the tool attachment part 42b of the micro-tool 4 or the gauge attachment part 5c of the positioning gauge 5. The rotation mechanism 8 is a mechanism for pivoting the holding part 30 (the micro-tool 4 or the positioning gauge 5) around the reference position O1 in upper-lower directions (directions shown by arrows a, b). The linear movement mechanism 9 is a mechanism for linearly moving the holding part 30 (the micro-tool 4 or the positioning gauge 5) in the T-directions (directions shown by arrows c and d) of the reference position O1.

<Holding Part>

As shown in FIG. 3, the holding part 30 is disposed above the linear movement mechanism 9 of the movement mechanism 3 capable of pivoting around the reference position O1 in the gauge hole 5b of the positioning gauge 5 detachably attached to the holding part 30. As shown in FIG. 5, the holding part 30 has a supporting case body 31, a lock slider 32, spring members 33, a cover member 34, fastening members 35, and stoppers 36. The supporting case body 31 is mounted on a linear slider 92 of the linear movement mechanism 9, which is to be described later, and hold the holding part 30. The lock slider 32 is slidably mounted on the supporting case body 31. The spring members 33 bias the lock slider 32. The cover member 34 houses the lock slider 32 so as to support the lock slider 32 slidably. The fastening members 35 fix the cover member 34 onto the supporting case body 31. The stoppers 36 regulate movements of the lock slider 32.

As shown in FIG. 3, the supporting case body 31 is mounted on the linear slider 92 disposed on a linear movement mechanism body 91 of the linear movement mechanism 9 slidably toward the reference position O1, and is a member to linearly move toward the reference position O1 and move back together with the linear slider 92. The supporting case body 31 has also a function to hold the holding part 30 and a cylinder tube 95.

The lock slider 32 is a slider mounted on the supporting case body 31 slidably in directions (directions shown by arrows e, f) orthogonal to an extending direction of the positioning gauge 5. The lock slider 32 has a lock groove 32a, spring insertion holes 32b, an unlocking operation part 32c, and guide grooves 32d. The lock groove 32a holds the gauge attachment part 5c or the tool attachment part 42b (refer to FIG. 1). The spring insertion holes 32b are holes in which the spring members 33 are inserted. The unlocking operation part 32c is a part to carry out an operation of releasing a state of holding the gauge attachment part 5c or the tool attachment part 42b in the lock grooves 32a. The guide grooves 32d are formed on the left and right side surfaces of the lock slider 32.

The lock groove 32a is a groove into which the gauge attachment part 5c and a part of the gauge body 5a in the vicinity of the gauge attachment part 5c in a front-rear direction, or the tool attachment part 42b (refer to FIG. 1) and a part of the tool holder body 42 in the vicinity of the tool holder body 42 in a front-rear direction are inserted to be held thereby. The lock groove 32a is formed in a cross shape in plan view, which shape is matched with the shape of the gauge attachment part 5c and the part of the gauge body 5a in the vicinity of the gauge attachment part 5c in the front-rear direction and the shape of the tool attachment part 42b (refer to FIG. 1) and the part of the tool holder body 42 in the vicinity of the tool holder body 42 in the front-rear direction. Since the lock slider 32 is biased toward the unlocking operation part 32c (in the direction of the arrow f) by the spring members 33, the gauge attachment part 5c and the part of the gauge body 5a in the vicinity of the gauge attachment part 5c in the front-rear direction attached in the lock groove 32a are held between one side wall surface of the lock groove 32a and a side wall surface of a notched groove 34a facing the one side wall surface.

As shown in FIG. 3, the spring insertion holes 32b are made of two cylindrical holes having bottoms, which holes are formed from an upper side surface of the lock slider 32 toward the unlocking operation part 32c.

The unlocking operation part 32c is formed at a side surface portion of the lock slider 32, which side surface is positioned on the opposite side of the spring insertion holes 32b. When the unlocking operation part 32c is pushed against forces of the spring members 33, the lock slider 32 is moved in the direction of the arrow e, so that the one side wall surface of the lock groove 32a is apart from the gauge attachment part 5c and the part of the gauge body 5a in the vicinity of the gauge attachment part 5c in the front-rear direction held between the one side wall surface of the lock groove 32a and the side wall surface of the notched groove 34a. Then, the lock slider 32 comes to be in a released state. In this way, since the gauge attachment part 5c of the positioning gauge 5 which has been held is released when the unlocking operation part 32c is operated to be pushed, the positioning gauge 5 can be replaced with the micro-tool 4 and the tool attachment part 42b can be held.

The guide grooves 32d are grooves for guiding the lock slider 32 movable in the directions (directions shown by the arrows e, f) orthogonal to the extending direction of the positioning gauge 5 or the micro-tool 4 and regulating the movement range of the lock slider 32 together with the stoppers 36. The guide grooves 32d are formed on the left and the right side surfaces of the lock slider 32 with the prescribed length in the directions of the arrows e, f.

The springs 33 are biasing members for making the holding part 30 be in the holding state by biasing the lock slider 32 in the direction (direction of the arrow f) to hold the gauge attachment part 5c or the tool attachment part 42b. The springs 33 are made of two compressed coil springs to be inserted in respective holes 32b of a pair of left and right spring insertion holes.

As shown in FIG. 3, the cover member 34 is a member for covering and supporting the lock slider 32 slidably in the directions (directions of the arrows e, f) orthogonal to the extending direction of the positioning gauge 5. The cover member 34 has the notched groove 34a, a casing portion 34b, flange portions 34c, a spring receiving portion 34d, and stopper holes 34e. The casing portion 34b supports the lock slider 32 slidably in the linear directions. The flange portions 34c are formed at front and rear ends of the casing portion 34b. The spring receiving portion 34d is formed on upper side surface of the casing portion 34b. The stopper holes 34e are formed on front and rear side surfaces of the casing portion 34b.

The notched groove 34a is a groove for exposing the lock groove 32a of the lock slider 32 disposed so as to be covered by the cover member 34. As shown in FIG. 3, the notched groove 34a has also a function to hold the gauge attachment part 5c and the vicinity of the gauge attachment part 5c in the front-rear direction or the tool attachment part 42b (refer to FIG. 1) and the vicinity of the tool holder body 42 in the front-rear direction, by a lower edge portion of the notched groove 34a formed in a T-shape and an upper side wall surface of the lock groove 32a formed in the cross shape.

As shown in FIG. 5, the casing portion 34b is made of a metal plate member defining a hollow rectangular tube body together with the supporting case body 31.

As shown in FIG. 3, the flange portions 34c are rectangular plate-like portions formed on the left and the right sides of the cover member 34, and is formed so that the front and the rear end portions of the casing portion 34b are bended in L-shapes.

The spring receiving portion 34d is a portion for receiving an upper end portion of a spring 33, and is formed so that the upper side of the cover member 34 is bended in an L-shape.

As shown in FIG. 5, the stopper holes 34e are through holes for attaching the stoppers 36 and are made of screw holes bored toward the guide grooves 32d from the front and the rear side surfaces of the casing portion 34b.

As shown in FIG. 3, the fastening members 35 are disposed to fix upper and lower four portions of the front and the rear flange portions 34c of the cover member 34.

As shown in FIG. 5, the stoppers 36 are members for regulating the movement range of the sliding lock slider 32, and are made of male screws. Male screw portions of the stoppers 36 are screwed into the stopper holes 34e on the both side surfaces. The stoppers 36 are disposed so that front end portions of the male screw portions of the stoppers 36 are positioned in the guide grooves 32d, so that the front end portions of the stoppers 36 abut against an inner wall surface of the guide grooves 32d to regulate the movements of the lock slider 32 when the lock slider 32 finishes moving to a prescribed position.

<Linear Movement Mechanism>

As shown in FIG. 5, the linear movement mechanism 9 is a device which advances or retreats the supporting case body 31 provided with the holding part 30 in the T-directions (T-axis directions), so that the micro-tool 4 or the positioning gauge 5 is retreated in the T-directions, or advanced (got back) to the originally positioned location or the like. The linear movement mechanism 9 has a first linear movement mechanism 9A, a second linear movement mechanism 9B, and a stopper mechanism 90 (refer to FIG. 6). The first linear movement mechanism 9A can linearly move the supporting case body 31 by a short distance in the T-directions. The second linear movement mechanism 9B can linearly move the supporting case body 31 by a distance in the T-directions longer than the first linear movement mechanism 9A. The stopper mechanism 90 regulates the movements of the linear movement mechanism 9.

The first linear movement mechanism 9A is a device for moving the holding part 30, for example, by hydraulic pressure supplied through a tube 96 via a control valve of a linear movement mechanism operational device from a hydraulic cylinder not shown. The first linear movement mechanism 9A has a piston (not shown) connected to the holding part 30, a cylinder tube 95 housing the piston so as to be capable of linearly moving, the tube 96 for supplying hydraulic pressure into the cylinder tube 95, the supporting case body 31 holding the cylinder tube 95, and the stopper mechanism 90 (refer to FIG. 6) for regulating the movements of the holding part 30.

The piston (not shown) is connected to the holding part 30 via a connecting member not shown, and is disposed so as to be capable of moving in the T-directions together with the holding part 30, for example, by about 10 mm, by supplying hydraulic pressure into the cylinder tube 95.

The cylinder tube 95 is a linear movement mechanism drive portion for linearly moving the holding part 30 by moving the piston according to the hydraulic pressure supplied into the cylinder tube 95.

The tube 96 is a hydraulic pressure supply tube through which the hydraulic pressure supplied via the control valve of the linear movement mechanism operational device from the hydraulic cylinder not shown is supplied into the cylinder tube 95.

Figure 6:
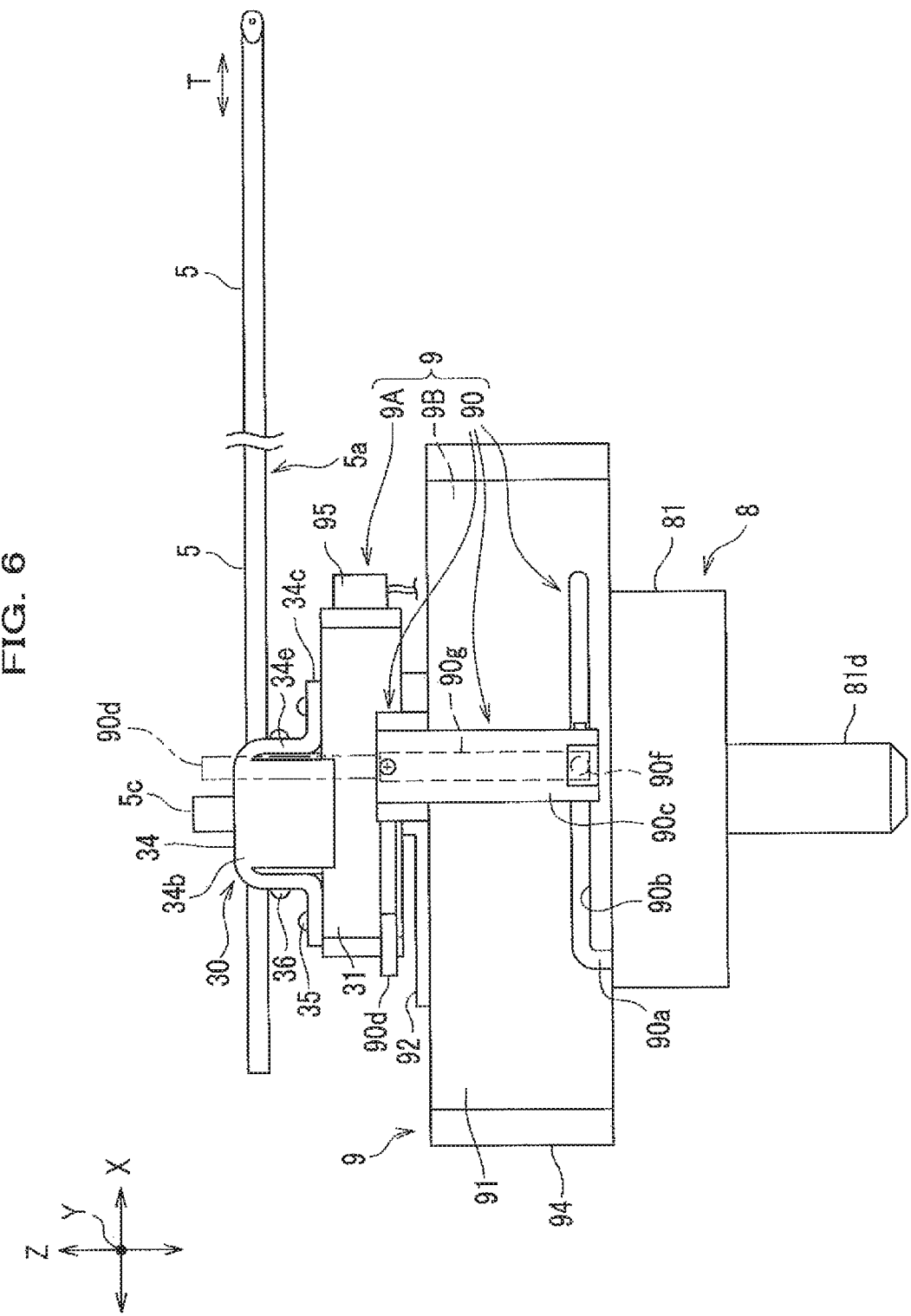
FIG. 6 is a schematic enlarged side view showing the movement mechanism.

As shown in FIG. 6, the cylinder tube 95 is disposed inside the supporting case body 31, a lock lever 90d and a stopper slide supporter 90c of the stopper mechanism 90 are disposed outside the supporting case body 31, and the supporting case body 31 is disposed on the linear slider 92 of the second linear movement mechanism 9B. The first linear movement mechanism 9A is disposed so as to be capable of moving in the T-directions relative to the linear slider 92. The first linear movement mechanism 9A is moved together with the linear slider 92 of the second linear movement mechanism 9B when the linear slider 92 moves in the T-directions.

AS shown in FIG. 5, the second linear movement mechanism 9B has the linear movement mechanism body 91, the linear slider 92, and a return spring 93. The linear slider 92 is disposed slidably in the T-directions (including the direction toward the reference position O1) relative to the linear movement mechanism body 91. The return spring 93 is for returning the linear slider 92, which has been retreated by hand, toward the original position. The second linear movement mechanism 9B is configured to be capable of retreating toward the rear of the T-axis from the reference position O1 at the front end of the positioning gauge 5 or the micro-tool 4, for example, by 50 mm by pulling the linear slider 92 to move it in one of the T-directions, for example, by hand. When a hand is released in a state of releasing the lock lever 90d, the second linear movement mechanism 9B lets the micro-tool 4 or the holding part 30 automatically return to its original position through the spring force of the return spring 93.

The linear movement mechanism body 91 is a housing member for supporting the linear slider 92 and is formed as a box type member opening upward. The linear movement mechanism body 91 has an opening portion 91a, linear movement mechanism guide grooves 91b, and a spring set groove 91c. The linear slider 92 is put in the opening portion 91a so as to be slidable in the T-directions. The linear movement mechanism guide grooves 91b are formed on the left and the right wall surfaces in the opening portion 91a. The spring set groove 91c is a groove for disposing the return spring 93 on an inner wall surface of the opening portion 91a. The linear movement mechanism body 91 is made of a casing body having a rectangle shape in plan view, and is extended toward the reference position O1.

The lower portion of the linear slider 92 is disposed so as to be slidable in the T-directions inside the opening portion 91a of the linear movement mechanism body 91, and the upper end portion thereof is connected to the undersurface of the supporting case body 31. Slider projections 92a, which are engaged slidably with the linear movement mechanism guide grooves 91b, are formed on the front and the rear sides on the left and the right side surfaces of the lower portion of the linear slider 92.

The return spring 93 is made of a tension coil spring for pulling the linear slider 92 to return it to its original position, and one end thereof is fixed to a rear side surface of the linear slider 92 and the other end is fixed to a rear inner wall surface of the opening portion 91a of the linear movement mechanism body 91.

As shown in FIG. 6, the stopper mechanism 90 is a device for regulating movements of the holding part 30, the first linear movement mechanism 9A, and the second linear movement mechanism 9B in the T-directions. The stopper mechanism 90 has a guide groove 90b, an engagement groove 90a, a stopper guide claw 90f, a stopper slide supporter 90c, the lock lever 90d, and a connecting member 90g. The guide groove 90b is formed on an outer wall surface of the linear movement mechanism body 91. The engagement groove 90a is formed contiguously with the base end side of the guide groove 90b in an L-shape. The stopper guide claw 90f slides in the guide groove 90b and the engagement groove 90a. The stopper guide claw 90f is disposed on the stopper slide supporter 90c. The lock lever 90d is pivoted at the upper portion of the stopper slide supporter 90c so as to be movable upward and downward. The upper end of the connecting member 90g is connected to the lock lever 90d, and the lower end thereof is connected to the stopper guide claw 90f.

The engagement groove 90a is a lock groove formed at the prescribed position on the outer wall surface of the linear movement mechanism body 91, and is formed to be directed downward from the base end of the guide groove 90b in the L-shape in side view.

The guide groove 90b is made of a groove having a concave shape in cross section, which extends straight along the linear movement mechanism body 91.

The stopper guide claw 90f is disposed slidably in the guide groove 90b and the engagement groove 90a. The stopper guide claw 90f moves together with the stopper slide supporter 90c in the T-directions while guiding the stopper slide supporter 90c, and moves downward together with the stopper slide supporter 90c to enter the engagement groove 90a, which regulates movements of the first linear movement mechanism 9A and the second linear movement mechanism 9B in the T-axis directions.

The lock lever 90d is a rotary operation lever to be directed in the T-axis directions (the direction toward the base end side and the direction toward the front end side) at the time of letting the micro-tool 4 or the positioning gauge 5 movable in the T-directions, and to be pressed downward in a state of standing upward for locking at the time of locking the micro-tool 4 or the positioning gauge 5 to regulate movements in the T-directions.

The stopper guide claw 90f is moved downward via the connecting member 90g by pressing downward the lock lever 90d to be moved into the engagement groove 90a, so that a locking state is attained. And furthermore, the front end of the stopper guide claw 90f is disengaged via the connecting member 90g from the engagement groove 90a to move to the guide groove 90b by pressing down the lock lever 90d, so that the first linear movement mechanism 9A and the second linear movement mechanism 9B can move linearly.

The stopper guide claw 90f is attached to the lower end portion of the stopper slide supporter 90c to project toward the guide groove 90b, the lock lever 90d is pivoted at the upper portion of the stopper slide supporter 90c, and the stopper slide supporter 90c is integrated with the linear slider 92.

The connecting member 90g is disposed on a back surface side of the stopper slide supporter 90c movably in the upper-lower directions, which back surface faces the linear movement mechanism body 91, and moves in the upper-lower directions according to operations of the lock lever 90d.

<Rotation Mechanism>

As shown in FIG. 5, the rotation mechanism 8 has a rotation mechanism body 81, a plurality of rollers 82, an angle adjustment screw 83, a knob 84, a nut 85, and a bearing 86. The plurality of rollers 82 are disposed to be rotatably in a circle-like groove 81a of the rotation mechanism body 81. The angle adjustment screw 83 is supported by support projections 81c (refer to FIG. 3) formed at an upper and a lower rear ends of the rotation mechanism body 81. The knob 84 is formed at one end of the angle adjustment screw 83. The nut 85 is engaged with the male thread of the angle adjustment screw 83. The bearing 86 is engaged with a bearing housing groove 85b on an upper surface of the nut 85.

As shown in FIGS. 1 and 3, the rotation mechanism 8 is configured so that the positioning gauge 5 or the micro-tool 4 can be inclined at an angle of, for example, 15 to 40 degrees around the reference position O1 by rotating the knob 84. Thus the movement mechanism 3 is configured so that the tips of the needle of the micro-tool 4 and the positioning gauge 5 can move around the same reference position O1 when the rotation mechanism 8 is operated for rotation. Therefore, even when the micro-tool 4 or the positioning gauge 5 is rotated by the movement mechanism 3, the reference position O1 is not changed. So defocusing does not occur. Even if the focus position is shifted, the amount of the shift is only a little within the range of the visual field of the microscope.

As shown in FIG. 3, the rotation mechanism body 81 has an arc groove 81a, roller engagement grooves 81b, the support projections 81c, an attachment shaft 81d, a nut support groove 81e, and a nut guide groove 81f. The arc groove 81a is formed to have an arc shape in side view. The roller engagement grooves 81b are formed on the front and the rear inner wall surfaces of the arc groove 81a. The support projections 81c are formed in a posture projecting rearward from the upper and the lower ends of the rotation mechanism body 81. The attachment shaft 81d is formed on the central portion of the undersurface of the rotation mechanism body 81 in a projecting posture. The nut support groove 81e is formed to be extended in the upper-lower directions on the rear end surface of the rotation mechanism body 81. The nut guide groove 81f is formed on the rear end side surface of the rotation mechanism body 81.

As shown in FIG. 1, the arc groove 81a is a housing groove in which three rollers 82 are rotatably disposed, which rollers are rotatably supported on the undersurface of the linear movement mechanism body 91. As shown in FIG. 3, the arc groove 81a is formed to have an arc shape with a radius of R1 around the reference position O1 in a side view. Therefore, the linear movement mechanism body 91 of the linear movement mechanism 9, which body the rollers 82 are supported by, the holding part 30 of the movement mechanism 3 mounted on the linear slider 92 of the linear movement mechanism 9, and the positioning gauge 5 or the micro-tool 4 (refer to FIG. 1) fixed to the holding part 30 are rotated along the arc groove 81a around the reference position O1, and are configured to be capable of adjusting the inclination angle θ1 without shifting the reference position O1.

AS shown in FIG. 1, the roller engagement groove 81b formed on the front inner wall surface of the arc groove 81a guides two rollers 82 disposed on the front side so as to move around the reference position O1 while the two rollers 82 are in contact with the roller engagement groove 81b formed on the front inner wall surface so as to be capable of rolling. The roller engagement groove 81b formed on the rear inner wall surface of the arc groove 81a guides one roller 82 disposed on the rear side so as to move around the reference position O1 while the one roller 82 is in contact with the roller engagement groove 81b formed on the rear inner wall surface so as to be capable of rolling. As shown in FIG. 5, the roller engagement grooves 81b are V-shaped grooves which are formed in the middle of the front inner wall surface and in the middle of the rear inner wall surface, of the arc groove 81a.

As shown in FIG. 3, the support projections 81c are bearing portions having respective holes, which portions rotatably support respective ones of both end portions of the angle adjustment screw 83 like a screw rod.

As shown in FIG. 5, the attachment shaft 81d is a shaft to connect the rotation mechanism body 81 to the micromanipulator 2.

The nut support groove 81e is a guide groove in which a slide projection 85a formed onto the nut 85 is slidably inserted, and is formed on the rear end surface of the rotation mechanism body 81 to be extended straightly in the upper-lower directions. The nut 85 is configured to move linearly in the upper-lower directions while being guided by the nut support groove 81e without rotation thereof even when the angle adjustment screw 83 is rotated because the slide projection 85a is inserted in the nut support groove 81e.

The nut guide groove 81f is formed at the upper edge of the nut support groove 81e, and is the rear end surface of the rotation mechanism body 81. The nut guide groove 81f is disposed so that the front end surface of the bearing housing groove 85b of the nut 85 slidably comes into contact with the nut guide groove 81f when the linear movement mechanism body 91 moves around the reference position O1.

Each of the rollers 82 is a rotor having a shape of a bead of an abacus in side view, and is disposed so that a roller 82 is in contact with an inner wall surface of a roller engagement groove 81b formed in the V-shape. Each of the rollers 82 is rotatably supported by a support shaft 82a fixed on the lower surface of the linear movement mechanism body 91 like a cantilever. As shown in FIG. 1, the rollers 82 are consisted of, for example, three rollers. Two rollers 82 disposed on the front side are engaged with the front roller engagement groove 81b, and the remained one roller 82 is engaged with the rear roller engagement groove 81b. Hereby, the linear movement mechanism body 91 can be connected to the rotation mechanism body 81 without backlash.

Figure 7:
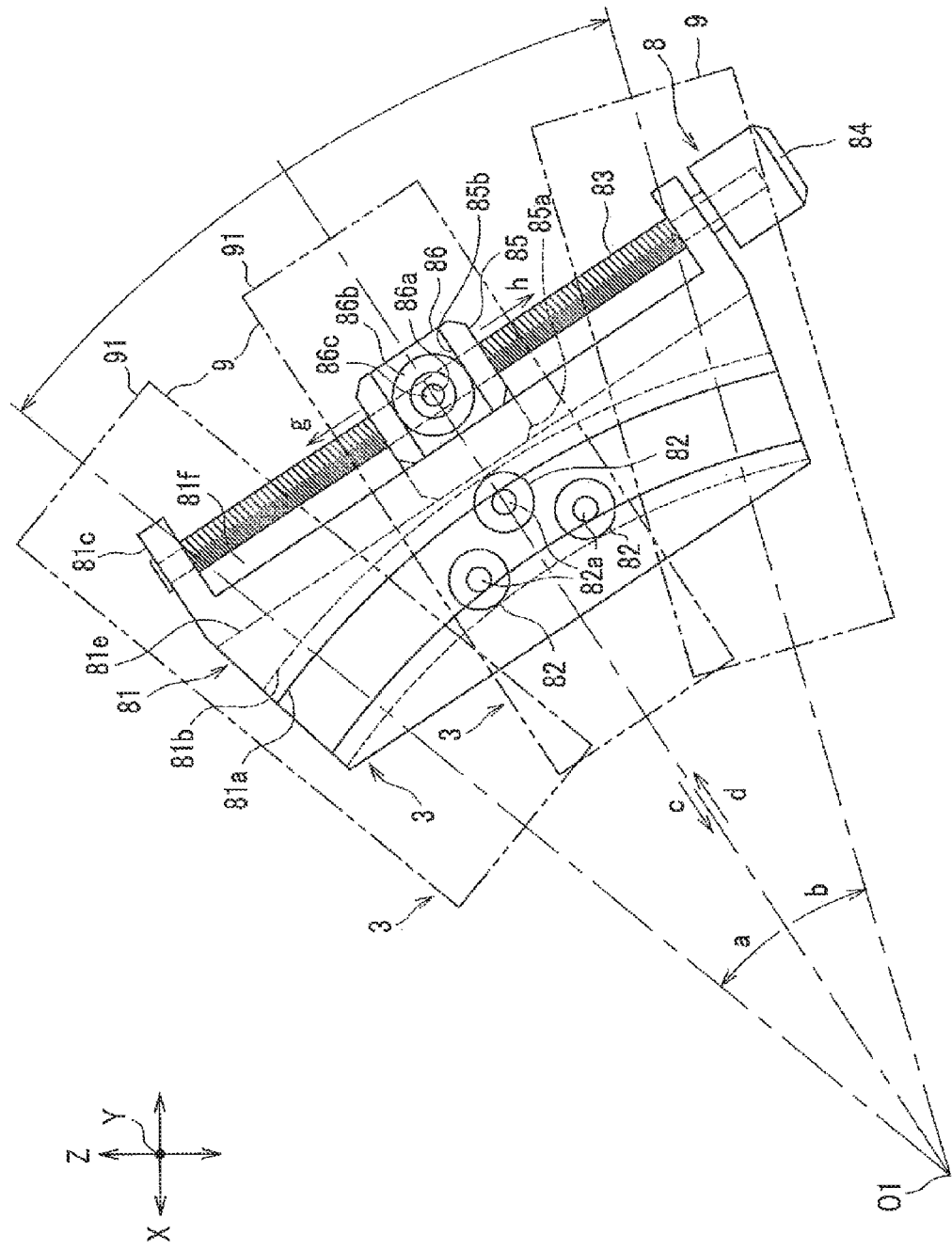
FIG. 7 is a schematic plan view taken from the line I-I in FIG. 5.

As shown in FIG. 7, the angle adjustment screw 83 is a screw bar for moving the holding part 30, to which the micro-tool 4 or the positioning gauge 5 is fixed, through the linear slider 92 of the linear movement mechanism 9 in the upper-lower directions around the reference position O1 by moving the nut 85 connected to the linear movement mechanism body 91 via the bearing 86 in the upper-lower directions (directions shown by the arrows g, h) by rotating the knob 84. The angle adjustment screw 83 is rotatably supported by the support projections 81c at the both end portions thereof, and the nut 85 engaged with the bearing 86 pivotally supported by the linear movement mechanism body 91 is screwed with the angle adjustment screw 83 in the middle portion thereof. Furthermore, the knob 84 is attached to the lower end of the angle adjustment screw 83.

The nut 85 has a female thread portion formed in the middle portion thereof, the slide projection 85a engaged with the nut support groove 81e slidably in the upper-lower directions, and the bearing housing groove 85b having a recessed shape engaged with the bearing 86.

The bearing 86 has an inner ring 86a fixed on the lower surface of the linear movement mechanism body 91 by a bearing attachment screw 86c, an outer ring 86b engaged with the bearing housing groove 85b, and steel balls interposed between the outer ring 86b and the inner ring 86a.

The X-axis micro-motion mechanism 23 shown in FIG. 1 is a linear driving device for moving the movement mechanism 3 in the X-directions (front-rear directions), and linearly moves the movement mechanism 3 in the X-directions, for example, by hydraulic pressure supplied from a hydraulic cylinder not shown via a control valve of an X-direction micro-motion operational device and a tube 23a.

The Y-axis micro-motion mechanism 24 is a linear driving device for moving the movement mechanism 3 in the Y-directions (left-right directions), and linearly moves the movement mechanism 3 in the Y-directions, for example, by hydraulic pressure supplied from the hydraulic cylinder not shown via a control valve of a Y-direction micro-motion operational device and a tube 24a.

The Z-axis micro-motion mechanism 25 is a linear driving device for moving the movement mechanism 3 in the Z-directions (upper-lower directions), and linearly moves the movement mechanism 3 in the Z-directions, for example, by hydraulic pressure supplied from the hydraulic cylinder not shown via a control valve of a Z-direction micro-motion operational device and a tube 25a.

<<Operations>>

Figure 8:
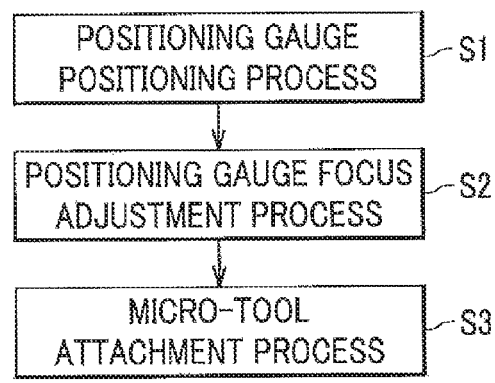
FIG. 8 is a flow chart showing a method of positioning the micro-tool.

Next, operations of the micro-manipulator device and the method for positioning the micro-tool according to the embodiment of the present invention will be explained in an operational process order with reference to FIGS. 1 to 7, mainly to FIG. 8.

<Positioning Gauge Positioning Process>

As shown in FIG. 3, in the case where the micro-tool 4 is attached to the micro-manipulator device 1 in the prescribed state, a positioning process S1, in which the positioning gauge 5 is attached to the holding part 30 of the movement mechanism 3 at first, and then, the positioning gauge 5 is positioned, is carried out.

In the positioning process S1, at first, the gauge attachment part 5c of the positioning gauge 5 is inserted into the holding part 30 to be fixed. The needle tip of the positioning gauge 5 is positioned in the Y-directions in the central portion on the inner bottom surface 7a of the dish 7 by operating the Y-direction micro-motion operational device (not shown) of the Y-axis micro-motion mechanism 24 shown in FIG. 1, and the movement in the Y-directions of the positioning gauge 5 is regulated by an exclusive adaptor (not shown) for exclusive use for the microscope 6, so that the positioning gauge 5 is fixed. Hereby, the positioning gauge 5 is positioned at the prescribed needle tip position in the Y-directions, so that positioning in the Y-directions becomes unnecessary.

Next, as shown in FIG. 3, the positioning gauge 5 is moved in the X-directions and the Z-directions by operating the Z-direction micro-motion operational device (not shown) of the Z-axis micro-motion mechanism 25 and the X-direction micro-motion operational device (not shown) of the X-axis micro-motion mechanism 23, so that the gauge surface 5d of the positioning gauge 5 is placed at the needle tip position on the inner bottom surface 7a of the dish 7 and the gauge hole 5b of the positioning gauge 5 is positioned on the optical axis 62a of the objective lens 62. Hereby, the positioning gauge 5 is positioned at the prescribed needle tip positions in the X-directions and the Z-directions.

Next, the inclination angle θ1 and a position in the T-directions (T-axis directions) of the positioning gauge 5 are set or positioned by the rotation mechanism 8 and the linear movement mechanism 9 of the movement mechanism 3. When the inclination angle θ1 of the positioning gauge 5 is set, the linear movement mechanism body 91, the holding part 30, and the positioning gauge 5 are rotated in the upper-lower directions (directions shown by arrows a, b) around the reference position O1 by rotating the knob 84, so that the adjustment of the inclination angle θ1 can be carried out.

When the position of the gauge hole 5b of the positioning gauge 5 is deviated in the T-directions (directions shown by arrows c and d), at first, the light emitted from the light source 63 is projected to the gauge hole 5b of the positioning gauge 5. When the position of the positioning gauge 5 is adjusted so that the position of the gauge hole 5b is on the optical axis 62a, it can be seen that the position is on the optical axis 62a because the inside of the gauge hole 5b is lightened by the light from the light source 63. And then, by operating the first linear movement mechanism 9A of the linear movement mechanism 9, the positioning gauge 5 is slightly moved in the T-directions, so that the central axis of the gauge hole 5b is aligned with the reference position O1 on the optical axis 62a.

Accordingly, the positioning gauge 5 can be positioned at the prescribed needle tip positions in the X, Y, Z, and T-directions and the inclination angle θ1 can be also set to the prescribed angle.

<Positioning Gauge Focus Adjustment Process>

Next, the focus adjustment process S2 for the positioning gauge 5, in which the microscope 6 is focused on the small hole 5e of the gauge hole 5b, is carried out.

<Micro-tool Attachment Process>

Subsequently, the locking state of the linear movement mechanism 9 is released by pressing down the lock lever 90d while holding the lock lever 90d in a standing posture. Then, the linear slider 92 of the second linear movement mechanism 9B, the holding part 30, and the positioning gauge 5 are moved in the T-direction to be retreated against the spring force of the return spring 93 shown in FIG. 5. Accordingly, the positions of the positioning gauge 5 in the X, Y, Z-directions are not changed and a position only in the T-directions is changed. In this state, the linear movement mechanism 9 is locked in the retreated state by operating the lock lever 90d.

Next, the unlocking operation part 32c of the lock slider 32 shown in FIG. 3 is pressed upward (direction of the arrow e). Then the lock groove 32a of the lock slider 32 holding the positioning gauge 5 while pressing the same, leaves the positioning gauge 5, so the gauge attachment part 5c of the positioning gauge 5 can be removed from the holding part 30. After the positioning gauge 5 is removed from the holding part 30 in such a manner, the tool attachment part 42b of the micro-tool 4 is pushed into the holding part 30, so that the micro-tool 4 is fixed to the holding part 30 as shown in FIG. 1.

In this state, the locking state of the linear movement mechanism 9 is released by operating the lock lever 90d, so that the linear slider 92 of the second linear movement mechanism 9B is pulled back because of the spring force of the return spring 93 shown in FIG. 5. Hereby, the holding part 30 and the micro-tool 4 are moved in the T-direction, so that the micro-tool 4 is automatically returned to the position to which positioning of the positioning gauge 5 has been done.

In this case, the micro-tool 4 has the tool attachment part 42b which can be similarly detachably attached to the holding part 30 at the same position (position of the distance L1 or L2 away from the reference position O1) as the gauge attachment part 5c of the positioning gauge 5 which has been positioned in the positioning process S1. Therefore, after the positioning gauge 5, which has been positioned, is moved in the T-direction and is replaced with the micro-tool 4 to be attached, the micro-tool 4 can be set with precision in a single operation to the prescribed positions in the X, Y, Z, T-directions and the prescribed inclination angle θ1 only by automatically returning the micro-tool to the original position to which the positioning has been carried out.

With the above, all processes are finished. According to the method for positioning the micro-tool of the present invention, the above indirect positioning of the micro-tool 4 makes a direct positioning operation of the micro-tool 4 unnecessary. Therefore, the positioning operation, which has been a complicated operation requiring skill, becomes simple, and can be carried out precisely and in a short time. After the positioning gauge 5, which has been positioned, is retreated by the movement mechanism 3 to a position at which the replacement operation can be easily carried out, the micro-tool 4 is attached only by pushing into the holding part 30, and is automatically returned to the original position to which the positioning gauge 5 has been positioned, so that the micro-tool 4 is attached in the state where the positioning is finished. Accordingly, the prior problem that the needle tip comes into contact with the dish 7 or the like to be damaged during the positioning operation is resolved, so that the cost due to the damage of the micro-tool 4 can be canceled.

That is, in the present invention, there is no necessity that the micro-tool 4 is moved in the X, Y, Z-directions to be positioned, so that even a person having no skill can repeatedly position the micro-tool 4 precisely, easily and rapidly. And furthermore, operational efficiency and operational ability of the positioning operation can be improved.

<First Modification>

Note that, the present invention is not limited to the aforesaid embodiment, various modifications can be done within the range of the technical concept, and the present invention also includes such modifications. Note that, explanations of the constitutions already explained are omitted and the same symbols are referred to them.

FIGS. 9A to 9C are schematic side views showing a first modification of the micro-tool of the micro-manipulator device according to the embodiment of the present invention.

In the previous embodiment, the micro-pipette, which has the angle θ2 of 30 degrees of the bent portion 41e of the base end of the fine portion 41d, has been explained as an example of the micro-tool 4 (refer to FIG. 2B), but as shown in FIGS. 9A to 9C, micro-tools 4A, 4B, 4C may be micro-tools, fine portions 4Ad, 4Bd, 4Cd of front end portions 4Ab, 4Bb, 4Cb of which are bent at appropriate angles θ21, θ22, θ23, respectively according to states of the inspection object S.

When the front end portions 4Ab, 4Bb, 4Cb including the fine portions 4Ad, 4Bd, 4Cd and tapered portions 4Ac, 4Bc, 4Cc are necessary to be held in a horizontal state in the dish 7 at the time of operation, it is easy for front end regions to be horizontally held if the angles θ21 to θ23 are obtuse angles. That is, even if base portions 4Aa, 4Ba, 4Ca of the micro-tools 4A, 4B, 4C are inclined, the front sides of the fine portions 4Ad, 4Bd, 4Cd come to be in a horizontal state because of the fine portions 4Ad, 4Bd, 4Cd bent at angles of about 120 to 160 degrees (θ21 to θ23), so that the front sides of the fine portions 4Ad, 4Bd, 4Cd can be disposed along the inner bottom surface 7a of the dish 7. Therefore, positioning operations of the front end portions 4Ab, 4Bb, 4Cb and an injection operation are easily carried out.

As shown in FIG. 9A, the length L3 of the base portion 4Aa, the length L4 of an inclined portion of the fine portion 4Ad, which inclined portion is straightly extended from the base portion 4Aa, and the length L5 of a horizontal portion of the fine portion 4Ad may be appropriately changed.

Figure 10:
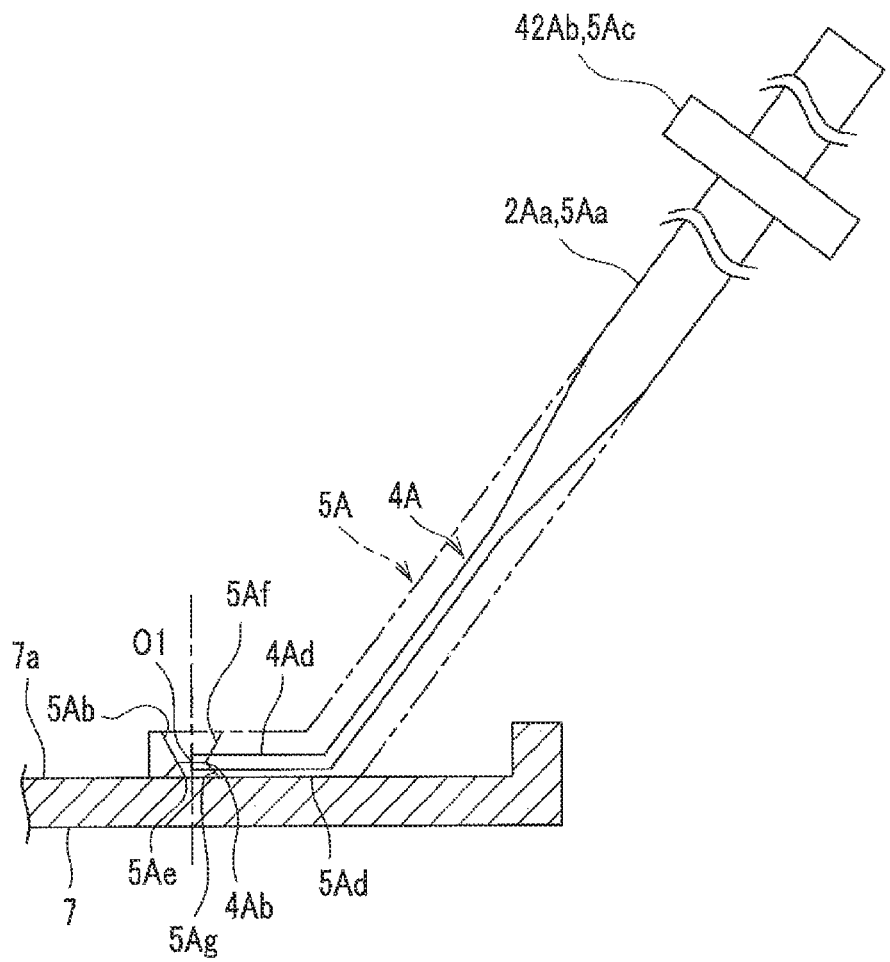
FIG. 10 shows a first modified example of the positioning gauge of the micro-manipulator device according to the embodiment of the present invention, and is a schematic side view showing an attached state of the micro-tool in place of the positioning gauge having been positioned.

FIG. 10 is a schematic side view showing a first modification of the positioning gauge of the micro-manipulator device according to the embodiment of the present invention, and showing a state when the micro-tool is attached in place of the positioning gauge which has been positioned.

As shown in FIG. 10, the positioning gauge 5A has a gauge attachment part 5Ac matching a tool attachment part 42Ab of the micro-tool 4A, a gauge surface 5Ad matching the bent fine portion 4Ad of the micro-tool 4A, and a gauge hole 5Ab located at the position matching the front end portion 4Ab of the micro-tool 4A. The positioning gauge 5A may be a gauge, the front end portion of which is bent to match the shape of the needle front portion of the micro-tool 4, which needle front portion is bent.

In such a manner, in the case where the positioning gauge 5A having the gauge attachment part 5Ac and the front end portion shape matching the shape of the micro-tool 4A is used, the positions in the X, Y, Z, T-directions and the inclination angle θ1 of the micro-tool 4A can be precisely set by attaching the micro-tool 4A to the holding part 30 in place of the positioning gauge 5A which has been positioned.

<Second Modification>

Figure 11:
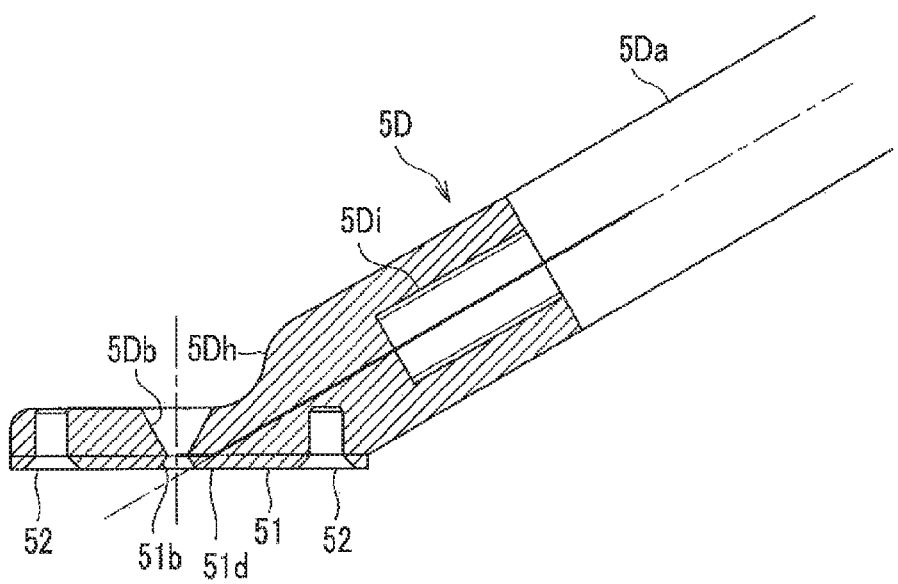
FIG. 11 is an enlarged partial schematic sectional view of a second modified example of the positioning gauge of the micro-manipulator device according to the embodiment of the present invention.

FIG. 11 is a schematic enlarged partial sectional view showing a second modification of the positioning gauge of the micro-manipulator device according to the embodiment of the present invention.

As shown in FIG. 11, the positioning gauge 5D may be configured to have a front end portion 5Dh which is detachably attached to a gauge body 5Da by using a screw portion 5Di or the like. Furthermore, an exchangeable plate 51, which has a second gauge hole 51b matching a gauge hole 5Db and a gauge surface 51d, may be attached on the lower surface of the front end portion 5Dh of the positioning gauge 5D by using screws 52 or the like.

In such a constitution, the positioning gauge 5D and the plate 51 can constitute a positioning gauge having a desired length and shape by being appropriately replacing with one or ones having a different length and/or a different shape.

Furthermore, in the case where the front end portion 5Dh or the gauge surface 51d of the positioning gauge 5D is damaged, only the plate 51 or the front end portion 5Dh needs to be replaced.

In the case where the length L5 of the horizontal portion of the fine portion 4Ad shown in FIG. 9A is about 0.5 to 2 mm, it can be covered even by using the positioning gauge 5A shown in FIG. 10. However, the case where the length K5 is over that value cannot be coped with, even by using that shown in FIG. 10. In such a case, the length L5 of the horizontal portion of the fine portion 4Ad can be coped with by replacing that shown in FIG. 10 with the positioning gauge 5D, the plate 51, or the like shown in FIG. 11. Furthermore, the replaceable plate 51 may be provided with a mark of a cross line or other shapes.

<Third Modification>

Figure 12:
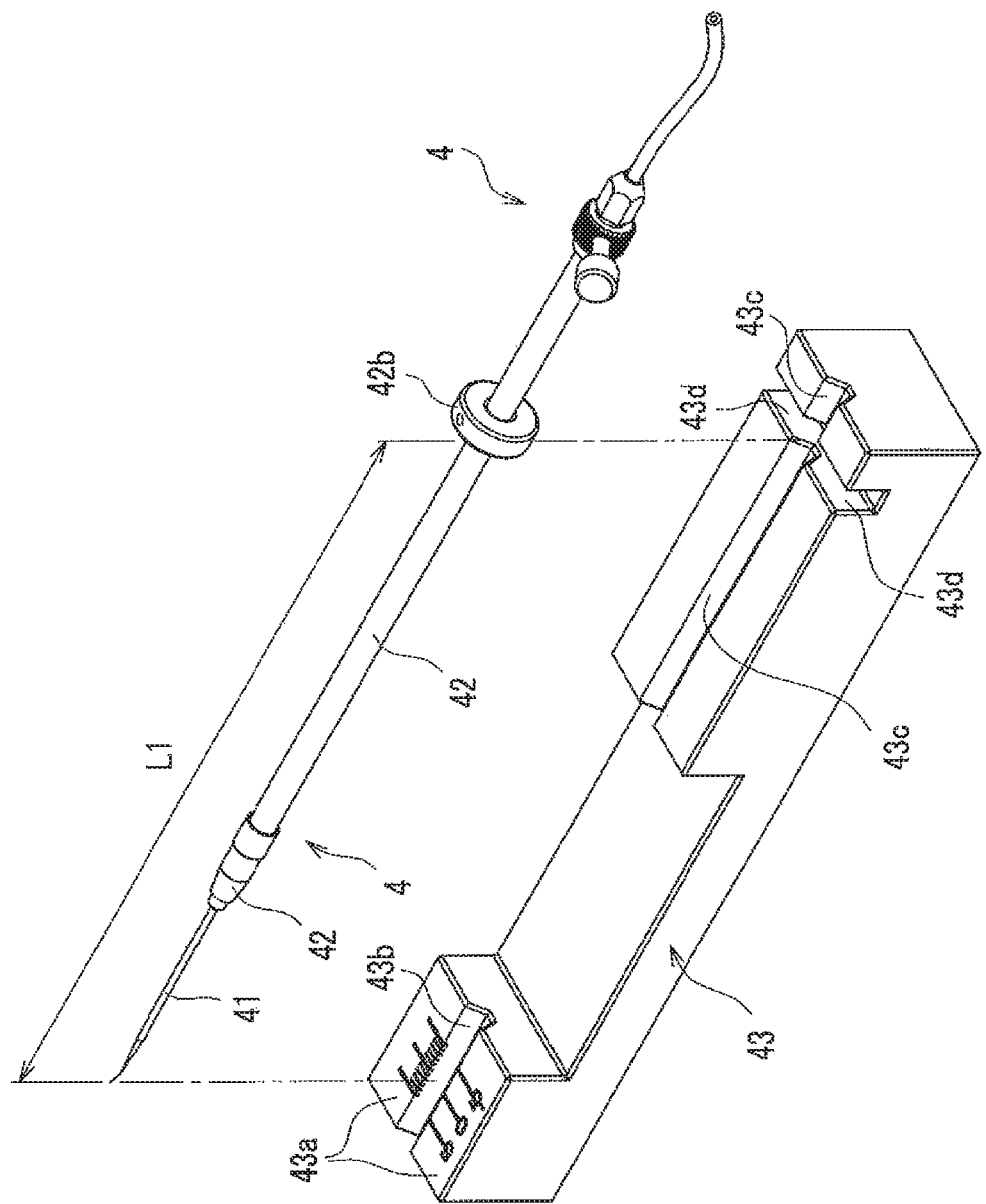
FIG. 12 is a schematic perspective view of a third modified example of the micro-manipulator device according to the embodiment of the present invention.

FIG. 12 is a schematic perspective view showing a third modification of the micro-manipulator device according to the embodiment of the present invention.

As shown in FIG. 12, regarding the micro-tool 4 in which the tool body 41 is attached to the front end of the tool holder body 42, when the distance L1 from the front end of the tool body 41 to the tool attachment part 42b is set to be a prescribed length, a length adjusting gauge 43 having a scale part 43a like a ruler may be used.

The length adjusting gauge 43 is a case body which has support grooves 43b, 43c, 43d for supporting the micro-tool 4 and the scale part 43a calibrated by, for example, a unit of mm. The scale part 43a is provided on an upper surface of the length adjusting gauge 43, which surface includes edge lines of the opened support groove 43b to support the tool body 41. The support groove 43c is a part to support the tool holder body 42. The support groove 43d is a part to support the tool attachment part 42b.

Regarding the micro-tool 4 and the length adjusting gauge 43, the tool attachment part 42b is engaged with the support groove 43d to place the micro-tool 4 on the length adjusting gauge 43, and the front end of the tool body 41 is set to the "zero" of the scale part 43a, so that the distance L1 from the front end of the tool body 41 to the tool attachment part 42b can be set to the prescribed length.

<Fourth Modification>

Figure 13:
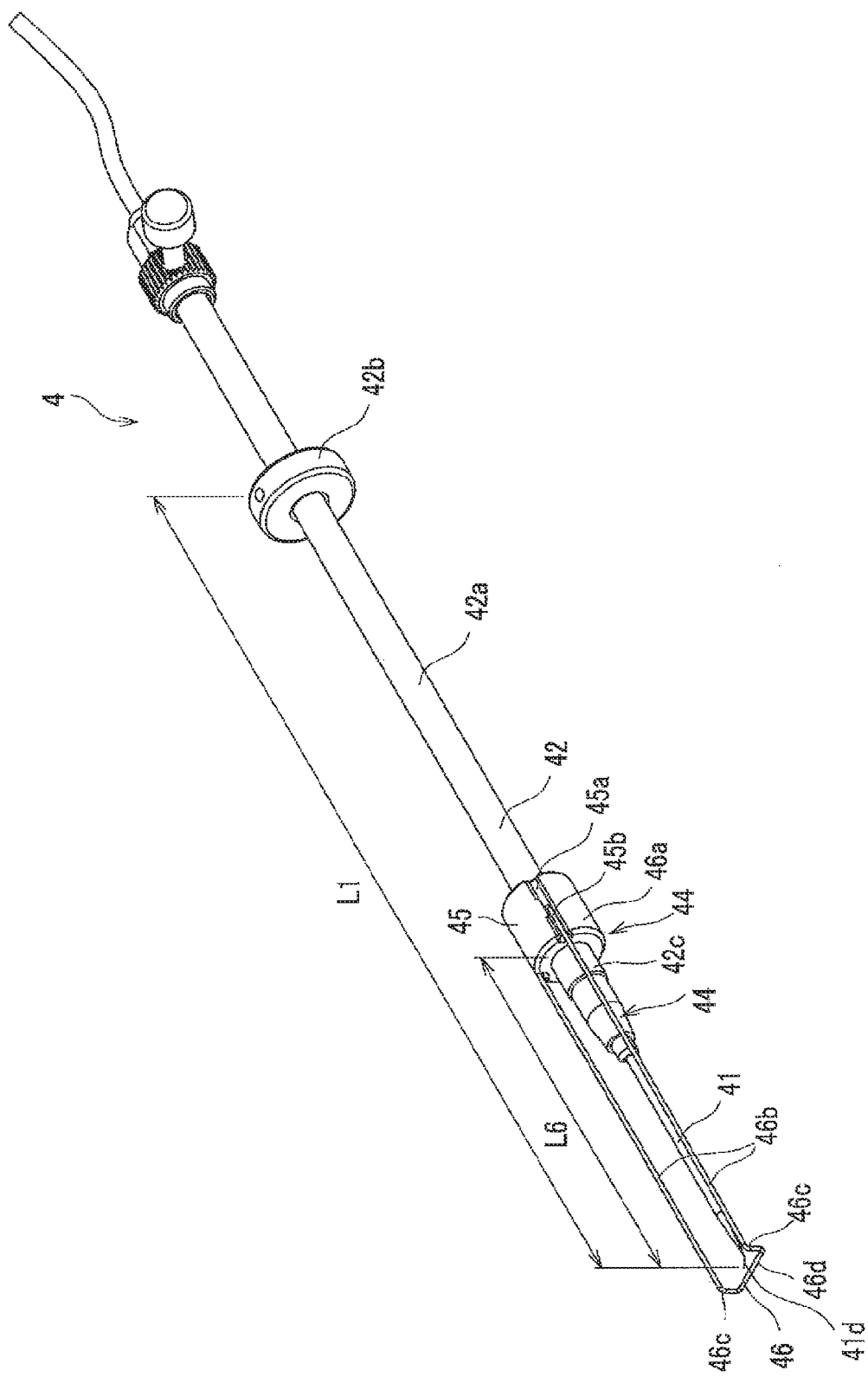
FIG. 13 is a schematic perspective view of a fourth modified example of the micro-tool of the micro-manipulator device according to the embodiment of the present invention.
Figure 14A:
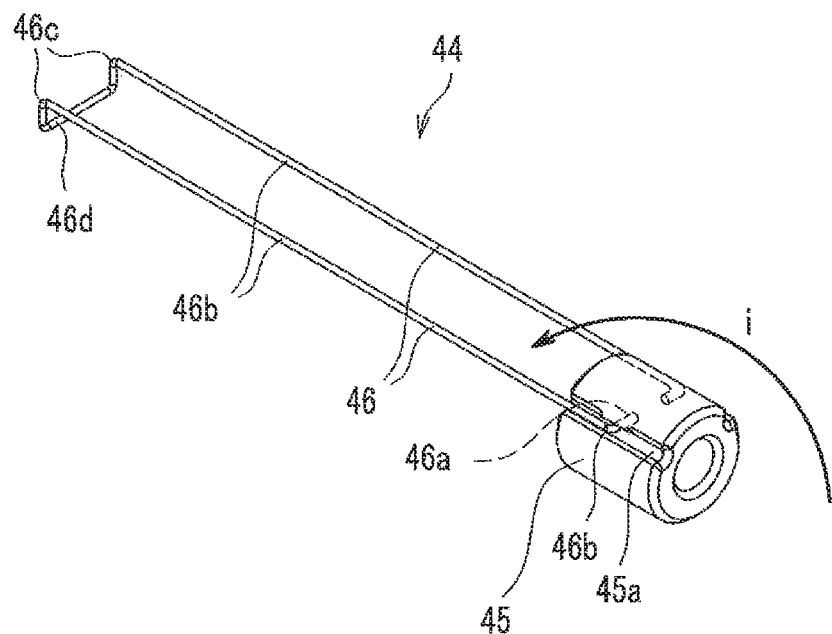
FIG. 14A is an enlarged schematic perspective view of a length-adjustment gauge of the fourth modified example of the present invention when it is installed in the micro-tool.
Figure 14B:
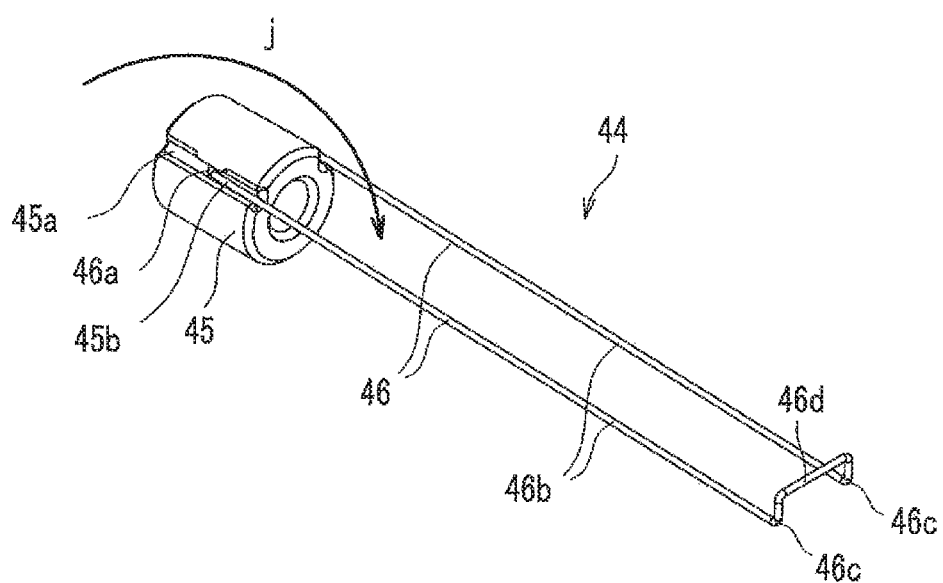
FIG. 14B is an enlarged schematic perspective view of the length-adjustment gauge of the fourth modified example of the present invention when it is housed in the micro-tool.

FIG. 13 is a schematic perspective view showing a micro-tool of a fourth modification of the micro-manipulator device according to the embodiment of the present invention. FIG. 14A is an enlarged schematic perspective view showing a length adjusting gauge of the fourth modification of the present invention when the gauge is installed in the micro-tool. FIG. 14B is an enlarged schematic perspective view showing the length adjusting gauge of the fourth modification of the present invention when the gauge is housed in the micro-tool.

As shown in FIGS. 13, 14A, 14B, the length adjusting gauge 44 may be a gauge attached to the micro-tool 4.

In this case, the length adjusting gauge 44 has a tube-like part 45 which is fitted on the outer surface of the front end portion of the cylindrical tube 42a, and a length fitting member 46 the base end portion of which is supported in support holes 45b formed at the middle portions of left and right support grooves 45a of the tube-like part 45 so as to be capable of turning in the front-rear directions.

The tube-like part 45 is fitted on the clamp screw 42c which is positioned at the front end portion of the cylindrical tube 42a. The length fitting member 46 is made of a wire member bent in a shape of almost U (almost recessed shape) in plan view of the whole. The length fitting member 46 has a pair of left and right shaft portions 46a formed at the base end portion, prescribed length portions 46b which are parallel to each other along the T-axis and are extended toward the front side from the shaft portions 46a, bent portions 46c bent downward from the front ends of the prescribed length portions 46b, and a recessed portion 46d having a recessed shape recessed downward from the bent portions 46c.

The prescribed length portions 46b are formed so that a length L6 from the shaft portions 46a to the bent portions 46c is a prescribed length. The micro-tool 4 is configured so that, when the prescribed length portions 46b are directed toward the front side (in a state where they are pushed down in a direction shown by an arrow i) as shown in FIGS. 13, 14A, the length from the front end of the tool body 41 to the tool attachment part 42b is equal to the distance L1 by making the front end of the fine portion 41d coincide with the position between the left and right bent portions 46c. When not used, the prescribed length portions 46b are turned to the base end side (in a direction shown by an arrow j) to be a housed state as shown in FIG. 14B.

<Fifth Modification>

Figure 15A:
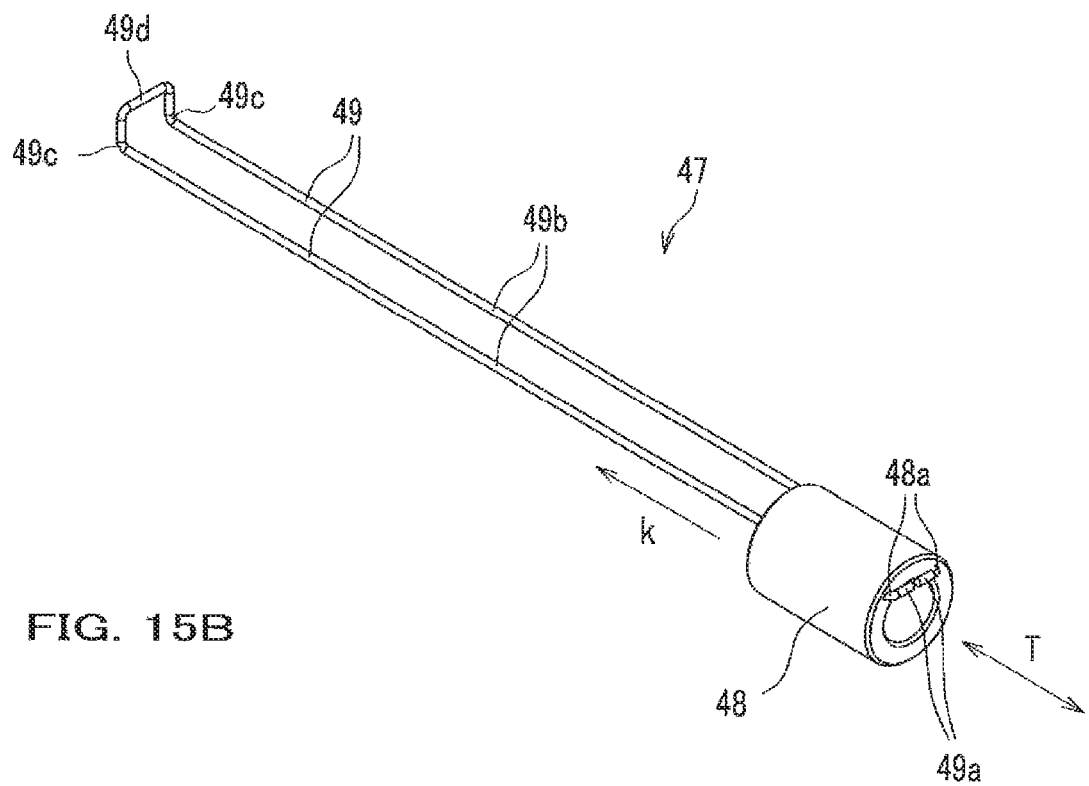
FIG. 15A is an enlarged schematic perspective view of a fifth modified example of the length-adjustment gauge of the micro-manipulator device according to the embodiment of the present invention when it is installed.
Figure 15B:
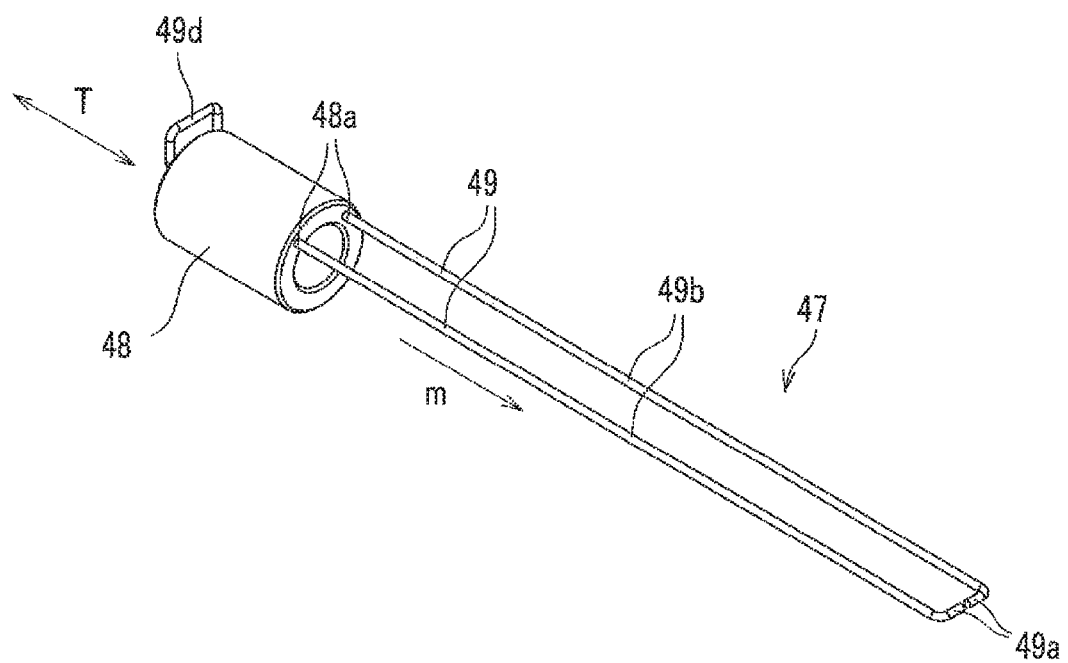
FIG. 15B is an enlarged schematic perspective view of the fifth modified example of the length-adjustment gauge of the micro-manipulator device according to the embodiment of the present invention when it is housed.

FIG. 15A is an enlarged schematic perspective view showing a length adjusting gauge of a fifth modification of the micro-manipulator device according to the embodiment of the present invention when the gauge is installed in the micro-tool. FIG. 15B is an enlarged schematic perspective view showing the length adjusting gauge of the fifth modification of the micro-manipulator device according to the embodiment of the present invention when the gauge is housed in the micro-tool.

The foresaid length adjusting gauge 44 of the fourth embodiment may be formed so that a length fitting member 49 is slidable in the T-directions (directions shown by arrows k, m) relative to a tube-like part 48 like a length adjusting gauge 47 shown in FIGS. 15A, 15B.

In this case, the length fitting member 49 is formed in almost the same shape as the length fitting member 46 of the fourth modification. That is, engagement portions 49a provided at the rear end of the length fitting member 49 and a recessed portion 49d (bent portions 49c) at the front end thereof abut against respective opening ends of through holes 48a formed in the tube-like part 48 so as to point in the T-directions, so that the length fitting member 49 is regulated regarding a length, in the range of which the length fitting member 49 can move linearly. As shown in FIG. 15A, the length adjusting gauge 47 is configured so that a length from the front end of the micro-tool 4 to the tool attachment part 42b is equal to the distance L1 when the length fitting member 49 is pulled toward the front side. And when the micro-tool 4 is not used, the length fitting member 49 is pushed toward the base end side (in a direction shown by an arrow m) to be housed as shown in FIG. 15B.

<<Other Modifications>>

In the foresaid embodiment, the case, where the gauge hole 5b is formed in the positioning gauge 5 and the central axis of the gauge hole is positioned to be aligned with the optical axis 62a, has been explained. However, the gauge hole 5b may be anything to serve as a mark when the positioning is carried out, for example, it may be a mark such as a point or a scale.

Furthermore, the gauge hole 5b may be any hole to serve as a positioning point when the positioning is carried out, and a shape of the gauge hole 5b may be appropriately modified. For example, it may be a straight hole, a hole which has an upper enlarged hole 5f enlarged toward the upper side and a lower hole of a straight hole contiguous with the upper enlarged hole, or a hole having a stepwise shape.

And furthermore, in the foresaid embodiment, the case where the micro-tool 4 of a capillary pipette is positioned has been explained as an example, but the present invention can be appropriately applied to even a case where a bar member or a tube member in any fields is positioned.

DESCRIPTION OF THE SYMBOLS

1 Micro-manipulator device
2 Micro-manipulator
3 Movement mechanism
3a Holding part
4, 4A, 4B, 4C Micro-tool
5, 5A, 5B, 5C, 5D Positioning gauge
5b, 5Ab, 5Bb, 5Db Gauge hole (Mark)
5c, 5Ac Gauge attachment part
5d, 5Ad, 51d Gauge surface
6 Microscope
7 Dish
7a Inner bottom surface
8 Rotation mechanism
8 Linear movement mechanism
9A First linear movement mechanism (Linear movement mechanism)
9B Second linear movement mechanism (Linear movement mechanism)
30 Holding part
42b Tool attachment part
61 Table
61a Opening
62 Objective lens
62a Optical axis
L1, L2 Prescribed distance
S Inspection object
S1 Positioning gauge positioning process
S2 Positioning gauge focus adjustment process
S3 Micro-tool attachment process

What is claimed is:

1. A method for positioning a micro-tool comprising:
a positioning gauge positioning process including placing a gauge surface of a positioning gauge at a needle tip position while the positioning gauge is fixed to a holding part, and aligning a mark provided in the positioning gauge with an optical axis of an object lens; and
a micro-tool attachment process including fixing the micro-tool to the holding part after removing the positioning gauge from the holding part.

2. The method for positioning a micro-tool according to claim 1, further comprising a positioning gauge focus adjustment process to focus on the mark in a state where the positioning gauge has been positioned in the positioning gauge positioning process.

3. The method for positioning a micro-tool according to claim 1,
wherein the positioning gauge comprises a gauge attachment part provided at a position away from the mark formed at a front end portion toward a base end side of the positioning gauge by a prescribed distance set beforehand, and
wherein the micro-tool comprises a tool attachment part provided at a position away from a front end toward a base end side of the micro-tool by the same distance as the prescribed distance.

4. The method for positioning a micro-tool according to claim 1,
wherein the positioning gauge is held by the holding part in an upward oblique posture positioned on and above an inner bottom surface of a dish placed at a prescribed position on a table of a microscope,
wherein the gauge surface is formed to be flat at a front end portion of the positioning gauge, and is placed on the inner bottom surface of the dish at a time of positioning, and
wherein the mark is formed to be orthogonal to the gauge surface, and is positioned on the optical axis at the time of positioning.

5. The method for positioning a micro-tool according to claim 1,
wherein the holding part is provided in a movement mechanism for moving the positioning gauge detachably attached to the holding part,
wherein the movement mechanism comprises a rotation mechanism for pivoting the holding part holding the positioning gauge around the mark formed at the front end portion of the positioning gauge, and a linear movement mechanism for linearly moving the holding part in T-directions along the positioning gauge, to position the positioning gauge, and
wherein the micro-tool is attached after the holding part holding the positioning gauge, positioning of which has been finished, releases the positioning gauge in a state of fixing a position on a Y-axis.

6. The method for positioning a micro-tool according to claim 5, wherein the linear movement mechanism advances the holding part to return to a position where the positioning gauge has been positioned after the holding part holding the positioning gauge, positioning of which has been finished in the positioning gauge positioning process, is retreated.

7. A micro-manipulator device comprising:
a micro-tool having a tool attachment part provided at a position away from a front end toward a base end side of the micro-tool by a prescribed distance set beforehand, and
a micro-manipulator for carrying out micro operation on an inspection object in a visual field of a microscope with use of the micro-tool,
characterized in that the micro-manipulator device comprises:
a holding part to detachably hold the micro-tool or a positioning gauge having a gauge attachment part provided at a position away from a mark provided at a front end portion toward a base end side of the positioning gauge by the prescribed distance; and
a movement mechanism for positioning the positioning gauge in T-axis directions.

8. The micro-manipulator device according to claim 7, wherein the movement mechanism comprises:
a rotation mechanism for pivoting the holding part holding the positioning gauge around the mark provided at the front end portion of the positioning gauge; and
a linear movement mechanism for linearly moving the holding part in the T-axis directions along the positioning gauge.

* * * * *